United States Patent [19]

Risk

[11] Patent Number: 4,793,676

[45] Date of Patent: Dec. 27, 1988

[54] OPTICAL FIBER ACOUSTO-OPTIC AMPLITUDE MODULATOR

[75] Inventor: William P. Risk, Redwood City, Calif.

[73] Assignee: The Board of Trustees of the Leland Stanford Junior University, Stanford, Calif.

[21] Appl. No.: 142,348

[22] Filed: Dec. 23, 1987

Related U.S. Application Data

[63] Continuation of Ser. No. 768,405, Aug. 21, 1985, abandoned, which is a continuation-in-part of Ser. No. 670,763, Nov. 13, 1984, abandoned.

[51] Int. Cl.$^4$ ............................. G02B 6/26; G02F 1/00
[52] U.S. Cl. ............................... 350/96.13; 350/96.14; 350/96.15; 350/358
[58] Field of Search .................. 350/358, 320, 96.12, 350/96.13, 96.14, 96.15

[56] References Cited

U.S. PATENT DOCUMENTS

| | | | |
|---|---|---|---|
| 3,645,603 | 2/1972 | Smith | 350/149 |
| 4,086,484 | 4/1978 | Steensma | 250/299 |
| 4,268,116 | 5/1981 | Schmadel et al. | 350/96.29 |
| 4,319,186 | 3/1982 | Kingsley | 350/96.29 |
| 4,684,215 | 8/1987 | Shaw et al. | 350/96.15 |

OTHER PUBLICATIONS

"Two-Mode Fiber Modal Coupler", R. C. Youngquist et al., Optics Letters, vol. 9, No. 5, May 1984, pp. 177-179.
"Acousto-Optic Frequency Shifting in Birefringent Fiber", by Risk et al, Optics Letters, vol. 9, No. 7, Jul. 1984, pp. 309-311.
"Active Polarization Coupler for Birefringent Fiber", by Brooks et al, Optics Letters, vol. 9, No. 6, Jun. 1984, pp. 249-251.
"Acoustic Fiber-Optic Modulators", by Risk et al., Ultrasonics Symposium, pp. 318-327, Nov. 1984.
F. Gfeller, "Electroacoustic Transducers for Optical Fiber Modulator and Tap," IBM Technical Disclosure Bulletin, vol. 21, No. 2, Jul. 1978, pp. 813-814.
F. Gfeller, "Modulator and Tap for Optical Fiber Systems," IBM Technical Disclosure Bulletin, vol. 21, No. 5, Oct. 1978, pp. 2014-2015.
E. J. Staples et al., "UHF Surface Acoustic Wave Resonators," 1974 Ultasonics Symposium Proceedings, IEEE Cat. No. 74 CHO 896-ISU, pp. 245-252.
Peter S. Cross, "Reflective Arrays for Saw Resonators," 1975 Ultrasonics Symposium Proceedings, IEEE Cat. No. 75 CHO 944-4SU, pp. 241-244.
K. M. Lakin et al., "Surface Wave Resonators," 1975 Ultrasonics Symposium Proceedings, IEEE Cat. No. 75 CHO 994-4SU, pp. 269-278.
C. Lardat et al., "Application of Edge-Bonded Transducers to SAW Components," Proceedings of the IEEE, vol. 64, No. 5, May 1976, pp. 627-630.
G. L. Matthaei et al., "S.A.W. Reflecting Arrays," Electronics Letters, vol. 12, No. 21, Oct. 14, 1976, pp. 556-557.
Peter S. Cross et al., "Surface-Acoustic-Wave Reasonators," Hewlett-Packard Journal, Dec. 1981, pp. 9-17.
K. Nosu et al., "Acousto-Optic Frequency Shifter for Single Mode Fibers," published at the 47th International Conference on Integrated Optics and Optical Fiber Commuinications in Tokyo, Jun. 27-30, 1983, Paper 29C5-3.

(List continued on next page.)

Primary Examiner—William L. Sikes
Assistant Examiner—Akm E. Ullah
Attorney, Agent, or Firm—Knobbe, Martens, Olson & Bear

[57] ABSTRACT

A fiber optic amplitude modulator couples light between two orthogonal polarization codes of a birefringent fiber. Dynamic coupling is caused by applying synchronized acoustic surface waves to the birefringent fiber in a direction normal to the fiber axis. A static biasing force is applied across the fiber to statically couple apparoximately 50% of the light input to one polarization mode into the other polarization mode. The additional force caused by the acoustic waves causes the fraction of coupled power to vary about the coupling caused by the static force.

32 Claims, 11 Drawing Sheets

OTHER PUBLICATIONS

K. Nosu et al., "Acoustooptic Phase Modulator for Single Mode Fibers," published at the 47th International Conference on Integrated Optics and Optical Fiber Communications in Tokyo, Jun. 27–30, 1983, Paper 28C3-5.

K. Nosu et al., "Acousto-Optic Frequency Shifter for Single Mode Fibers," Electronics Letters, vol. 19, No. 22, Sep. 29, 1983, pp. 816–818.

R. C. Youngquist et al., "Birefringent-Fiber Polarization Coupler," Optics Letters, vol. 8, No. 12, Dec. 1983, pp. 656–658.

R. H. Stolen et al., "In-Line Fiber-Polarization-Rocking Rotator and Filter," Optics Letters, vol. 9, No. 7, Jul. 1984, pp. 300–302.

Harris et al., "Acousto-Optic Tunable Filter", Journal of the Optical Society of America, vol. 59, No. 6, pp. 744–747.

Alferness et al., "Waveguide Electro-Optic Polarization Transformer", Applied Physics Letters, vol. 38, No. 9, May 1, 1981, pp. 655–657.

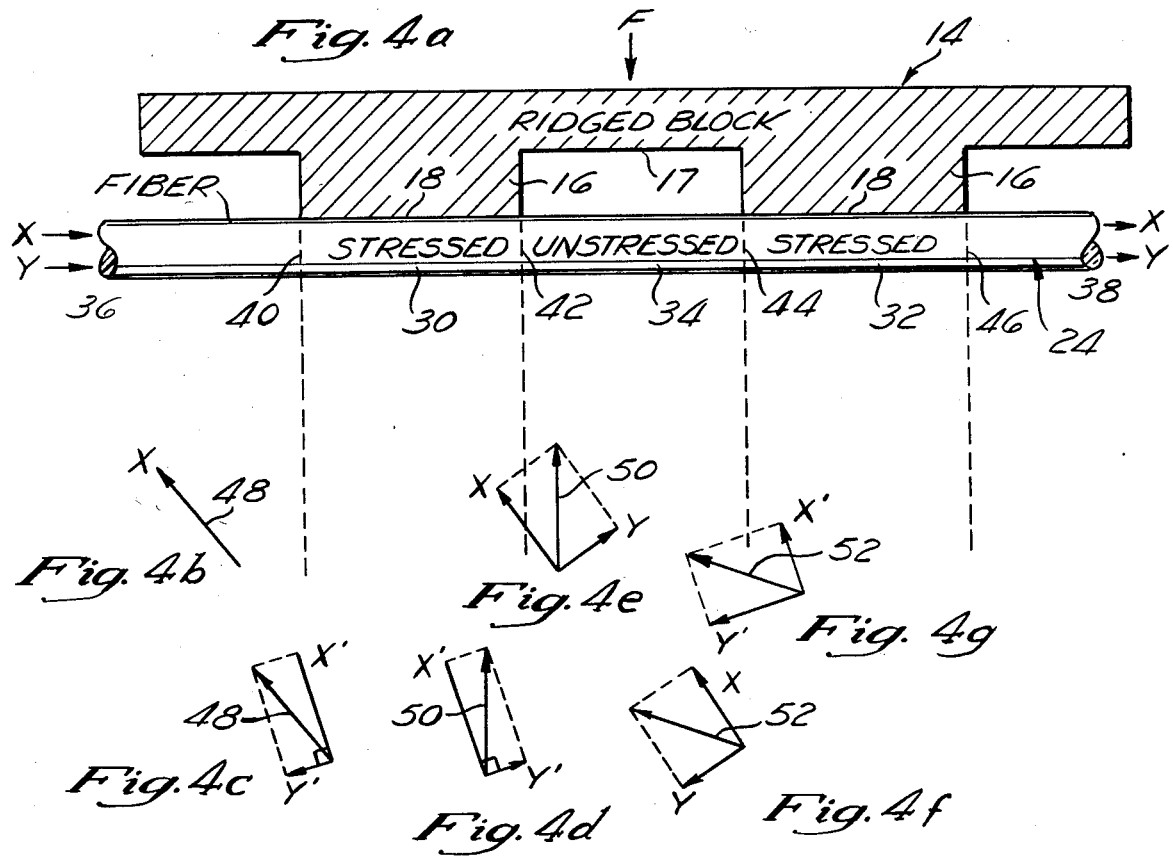
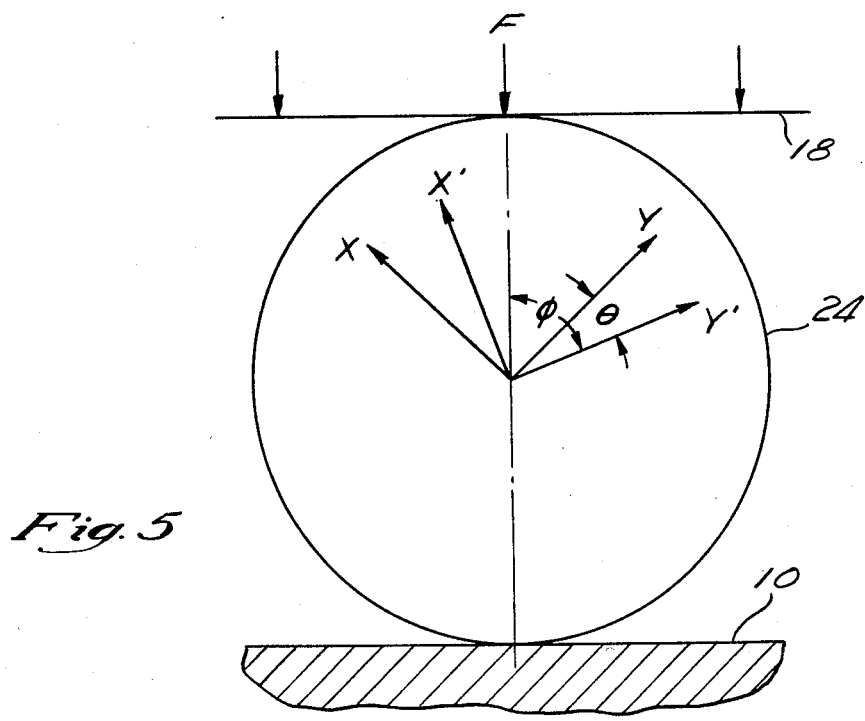

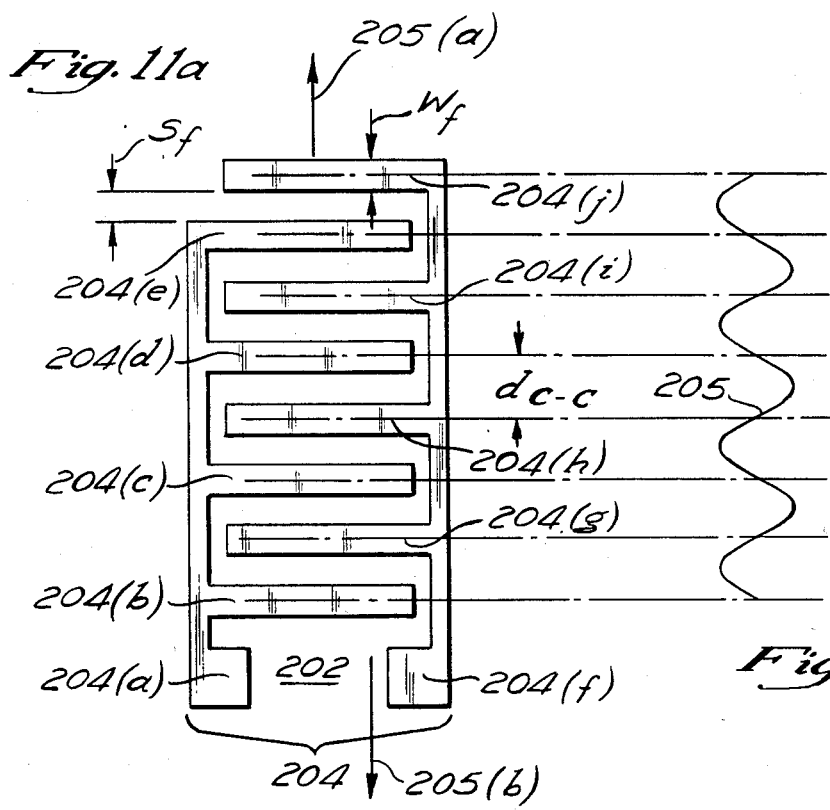
Fig. 11a
Fig. 11b
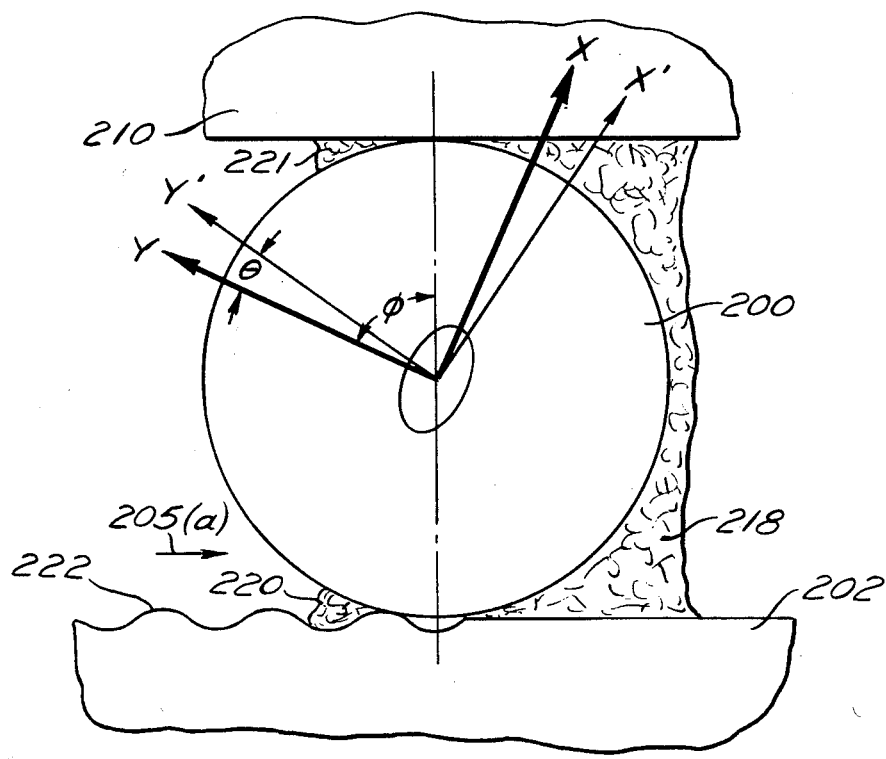
Fig. 12

OPTICAL FIBER ACOUSTO-OPTIC AMPLITUDE MODULATOR

RELATED APPLICATION

This application is a continuation of application Ser. No. 768,405, filed Aug. 2, 1985, which is a continuation-in-part of application Ser. No. 670,765, filed Nov. 13, 1984, both now abandoned.

FIELD OF THE INVENTION

The invention relates generally to devices which couple light energy between the polarization modes of an optical fiber in response to an acoustic signal, and more specifically, to the field of fiber optic amplitude modulators.

BACKGROUND OF THE INVENTION

It is useful to be able to transfer light energy traveling in an optical fiber from one waveguide to another dissimilar waveguide, i.e., one with different propagation characteristics. In fiber optics, a single birefringent fiber can be considered to be two dissiimilar waveguides in that the fiber can guide light and maintain its polarization in either of two independent polarization modes. To be able to control the power transfer between these two modes is highly desirable, and, if controlled in response to a varying signal results in the modulation of the power transfer.

In copending application Ser. No. 556,305, filed on Nov. 30, 1983, entitled "BIREFRINGENT FIBER NARROWBAND POLARIZATION COUPLER," and assigned to the assignee of the instant application, a four port directional coupler apparatus for controlling the transfer of power between dissimilar, linear, low loss waveguides and a method for causing such transfer was disclosed. The same coupler apparatus was also described in "Birefringent-fiber polarization coupler, "R. C. Youngquist, et al. *OPTICS LETTERS,* Vol. 8, No. 12, December 1983, pages 656–658. The dissimilar waveguides are the two orthogonal polarization modes of a single highly birefringent monomode optical fiber waveguide which is capable of maintaining the polarization of light traveling therein over long distances.

As disclosed in that application and paper, a plastic block with ridges machined thereon and a polished, flat surface are used to exert mechanical stress on a birefringent optical fiber waveguide. The ridges are one-half beat length wide (or an odd multiple thereof) and are separated by one-half beat length (or an odd multiple thereof). The beat length is equal to the distance traveled along the waveguide between locations at which the light traveling in the two orthogonal polarization modes are in phase. The purpose of the stress created by such ridges is to abruptly change the orientation of the birefringent axes of the fiber at periodic locations separated by one-half beat lengths.

Optical power can be transferred by pressing the ridges against the fiber which is resting on the polished, flat surface. The fiber is oriented so that the principal axes of birefringence are at some appreciable angle to the direction of the principal stress vector, preferably 45°. The stress created by the ridges causes the orientation of the axes of birefringence to shift abruptly at the edges of each of the ridge surfaces. The periodic abrupt shifting of the birefringent axes for an odd multiple of one-half beat length and then reversion of the axes to their original states for an odd multiple of one-half beat length by the absence of stress can cause substantially all the power launched in one polarization mode at the input of the device to be transferred to orthogonal polarization mode at the output of the device.

The device thus described can be used as an amplitude modulator by applying a time-varying signal to the ridges to cause the stress to vary periodically in time as well as in distance. However, the time-varying stresses must be applied uniformly at all of the stressed regions of the fiber. Furthermore, the signal must be of sufficient amplitude to move the significant mass of the block. Thus, a need exists for a device which will apply a time varying stress to a birefringent fiber without requiring the movement of a significant mass of material.

SUMMARY OF THE INVENTION

An optical fiber amplitude modulator is disclosed which comprises an optical fiber waveguide having two propagation modes for propagating a light signal therein, each mode having a different propagation velocity. In preferred embodiments of the modulator, these propagation modes are the two orthogonal polarization modes of a single mode birefringent optical fiber. The amplitude modulator comprises a means for producing a surface acoustic wave and for conducting the surface acoustic wave towards the fiber waveguide to impact the fiber waveguide. The acoustic wave has wave fronts which are oriented substantially parallel to the longitudinal axis of the fiber waveguide. The impact of the acoustic wave on the fiber waveguide causes an oscillating stress in the fiber waveguide which is time varying. The time varying stress causes time varying coupling of light between the propagation modes of the fiber waveguide. The amplitude modulator also includes means for optically biasing the time varying coupling to cause the time varying coupling to vary substantially linearly as a result of the oscillating stress caused by the acoustic wave.

In preferred embodiments of the modulator the means for producing the surface acoustic wave comprises a SAW (surface acoustic wave) conductor having a surface for propagating a series of surface acoustic waves. Preferably, each of the acoustic waves has a width substantially equal to an odd multiple of one-half the beat length of the fiber waveguide and the waves are separated by a distance substantially equal to an odd multiple of one-half the beat length. The fiber waveguide is placed in acoustic contact with the surface of the SAW conductor such that the propagation of the acoustic waves is in a direction normal to the longitudinal axis of the fiber waveguide.

In preferred embodiments, the fiber waveguide is preferably optically stressed by applying a force normal to the longitudinal axis of the fiber and at an angle to the two principal axes of birefringence. The stress causes a predetermined amount of optical power to be continuously transferred from one of the two orthogonal modes of polarization to the other, thereby providing a constant power transfer bias between such modes. The surface acoustic waves, which have wave fronts substantially parallel to the longitudinal axis of the optical fiber waveguide, cause the power transferred between the polarization modes to vary the stress-caused bias, thus providing amplitude modulation of the light in each of the modes. In alternative embodiments, the fiber waveguide can be optically stressed so that a portion (e.g., 50 percent) of an optical input signal is in one of the two polarization modes and a portion (e.g., 50 percent) is in the other of the two polarization modes.

In a preferred embodiment, the surface acoustic waves are generated in the SAW conductor surface by respective acoustic transducers, mounted on the SAW conductor. Preferably, the SAW conductor includes respective waveguides for guiding the surface acoustic waves from the transducers to the fibers. The acoutic waveguides can be formed, for example, by cutting grooves in the flat surface or by depositing a propagation medium on the surface such that the width and spacing of the ridges are odd multiples of one-half beat length.

In an alternative embodiment, acoustic waves can be generated by acoustic transducers and propagated on a SAW conductor having a flat surface (i.e., without ridges or grooves). The SAW conductor is preferably formed from an anisotropic material having a crystal lattice structure which is oriented relative to the longitudinal axis of the fiber such that the lattice structure provides a waveguide for the acoustic waves. The width of the transducers and the spacing between adjacent transducers are chosen such that the wave fronts have the widths and separation described above.

In the foregoing embodiments, the phase relationship between the acoustic waves are preferably selected so that the waves are in phase upon reaching the fiber. In another alternative embodiment, the acoustic waves are adjacent to each other, rather than being spaced apart. Accordingly, the phase relationship of the acoustic waves is preferably selected to provide a phase difference of $\pi$ radians between adjacent waves upon impacting the fiber.

The acoustic waves can be varied in amplitude to change the amount of transfer of power between the polarization modes to vary the magnitude of the amplitude modulation for light in each of the modes. Thus by modulating the acoustic waves in accordance with an information signal, the information contained therein can be encoded on the optical signal in the fiber as fluctuations in optical power in the modes.

In an alternative embodiment of the present invention, a static biasing stress is applied to an optical fiber to optically bias the optical fiber so that a fixed fraction of the optical energy in a first propagation mode is coupled to a second propagation mode. The fiber rests on a surface which can be a flat surface. The means for producing a surface acoustic wave is an acoustic transducer that causes an acoustic wave to propagate on the surface towards the optical fiber so that the wave fronts of the acoustic wave are substantially parallel to the longitudinal axis of the optical fiber. The time varying stresses on the fiber caused by the acoustic wave cause the amount of optical energy coupled from the first propagation mode to the second propagation mode to vary in accordance with the frequency and magnitude of the acoustic wave. The acoustic transducer is preferably an edge-bonded transducer mounted parallel to the longitudinal axis of the optic fiber. The acoustic wave fronts preferably have a width, as measured parallel to the longitudinal axis of the optical fiber, which is a plurality of beat lengths long. The frequency of an electrical signal applied to energize the acoustic transducer can be varied to thereby vary the frequency of the acoustic wave and thus vary the frequency of modulation of the optical energy transferred to the second polarization mode from the first polarization mode.

BRIEF DESCRIPTION OF THE DRAWINGS

FIGS. 4(a)-4(g) schematically illustrate the stressed regions in the fiber and the amount of power in the various polarization modes at various points along the fiber.

FIG. 5 shows the effect on the axes of polarization in a birefringent fiber when stress is applied.

FIG. 11(a) and 11(b) illustrate a typical transducer from the embodiment of FIG. 10 and the generated surface acoustic wave, respectively.

FIG. 12 is a cross-sectional view of the fiber in FIG. 10.

DETAILED DESCRIPTION OF THE PREFERRED EMBODIMENTS OF THE INVENTION

Before describing the preferred embodiments of the invention, a discussion of coupling between the polarization modes of a single mode birefringent optical fiber will be presented.

POLARIZATION COUPLING IN A BIREFRINGENT FIBER

In order to fully appreciate the operation of the present invention, it is helpful to understand the principles associated with polarization mode coupling. Accordingly, FIGS. 1-9 illustrate an exemplary polarization coupler and the theory of operation of such coupler. The coupler illustrated is also described in copending application Ser. No. 556,305.

Figure 1:
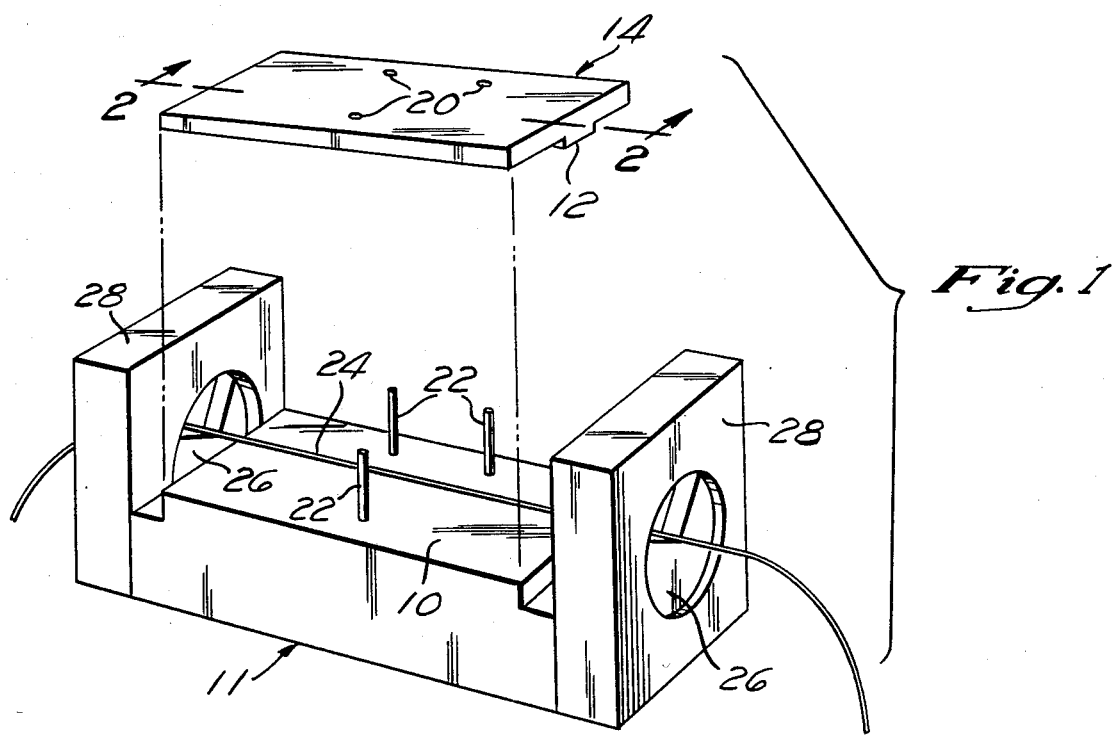
FIG. 1 is an exploded, perspective view of a narrow-band directional coupler.

Referring initially to FIG. 1, this coupler includes a polished, flat surface 10 which is machined on a metal or plastic block 11. The surface 10 should be smooth and flat to within a few microns. The surface 10 serves as the first of two surfaces between which an optical fiber waveguide is squeezed.

Figure 2:
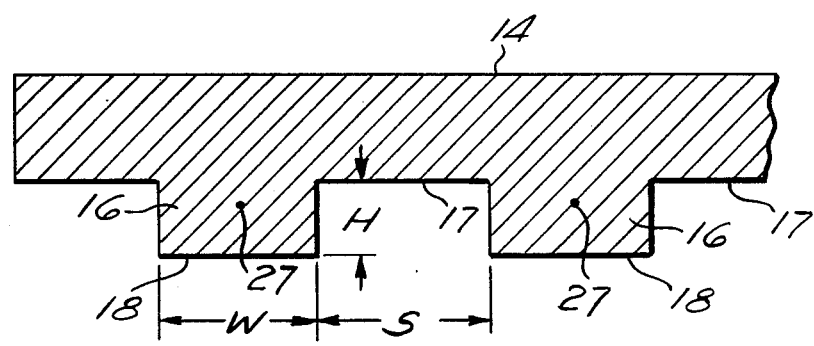
FIG. 2 is a cross section along the section line 2—2 of FIG. 1 showing the shape of the ridges of the coupler of FIG. 1.

The second surface is a multiple ridge region 12 machined on the under surface of a second block 14. As discussed hereinafter, the ridges 12 provide coupling elements which, when pressed against the fiber, stress the fiber to cause light to be coupled between the modes. Referring momentarily to FIG. 2 there is shown a cross section of the ridged region 12 in which a plurality of ridges 16 are formed. The ridges 16 are formed by machining the block 14 to provide spaced, parallel notches or grooves 17, such that there is formed a plurality of polished ridge surfaces 18 having a width W and a separation S between the edges of adjacent ridges. To obtain maximum coupling for a given force exerted on the fiber, the width W between the edges of each ridge should be one-half the beat length of the fiber for light at the particular frequency which is utilized. For compactness, the separation S should preferably be one-half beat length also.

Figure 3:
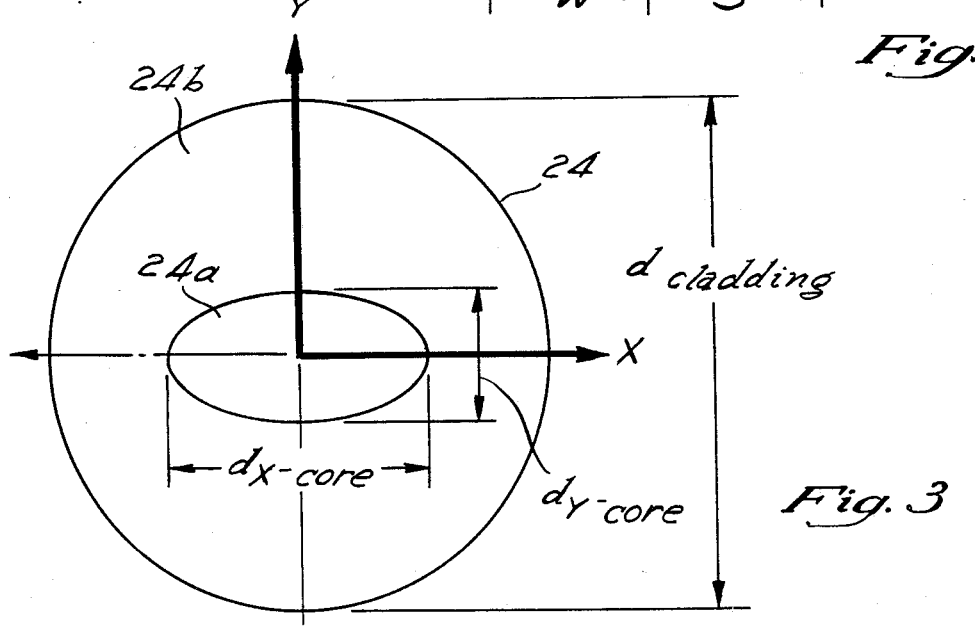
FIG. 3 is a cross-section of a typical birefringent fiber, illustrating the axes of birefringence.

FIG. 3 illustrates a typical birefringent fiber 24 as used in the present invention. The fiber 24 has an elliptical core 24a surrounded by a substantially circular cladding 24b which can have a diameter, $d_{cladding}$, on the order of 50-100 micrometers. The elliptical core has two principal axes, the X, or horizontal, axis and the Y, or vertical, axis. As a result of the non-circular core geometry, the fiber exhibits different refractive indices to light propagating along each of the two principal axes. As used herein, the Y-axis, having a shorter length, $d_{y-core}$, and a lower refractive index propagates light at a higher velocity than the X-axis, having a longer length $d_{x-core}$; therefore, the Y-axis will be referred to as the "fast axis," and the X-axis will be referred to as the "slow axis."

As described above, the birefringent fiber 24 supports two orthogonally polarized modes. The directions of linear polarization of these modes are the principal axes of the fiber 24 as set forth above. These linearly polarized modes are "normal" modes of the fiber; that is, they propagate through the fiber 24, unaltered except in phase. Optical signals may comprise a combination of the two modes. For example, light linearly polarized at 45° to the principal axes will consist of equal amounts of both modes initially in phase. As the two modes propagate down the fiber 24, they will accumulate a phase difference because their propagation constants differ. The distance required for $2\pi$ of phase difference to accumulate is called the "beat length" of the fiber and is given as $L=\lambda/\Delta n$, where $\lambda$ is the optical wavelength and $\Delta n$ is the difference in the refractive indices for the two polarizations. After traveling one half of a beat length, the two components will be separated by 180 degrees or $\pi$ radians.

Birefringent fiber, such as the elliptical core fiber 24, is commercially available from Andrew Corporation, 10500 West 153rd Street, Orland Park, Ill. 60462. By way of example, the elliptical core fiber 24 may have a beat length of 1.7 mm at an optical wave length of 633 nm. The metal coating and/or plastic jacket normally covering the fiber are preferably removed before using the fiber in the devices described herein.

Returning again to FIG. 2, in the embodiment shown, the separation distance S at the ridges equal their width W. However, in general, the dimensions W and S may be any odd multiple of one-half beat length. That is, each ridge can be any odd multiple of one-half beat length and each separation can be any odd multiple of one-half beat length, such that corresponding locations on adjacent ridges are separated by a multiple of one beat length. The cross section of the notches 17 in the preferred embodiment is rectangular because that is the easiest shape to machine. However, this shape is not critical; any shape which yields a flat surface 18 on the ridges 16 with a width W of one-half beat length and edge separations of one-half beat length will be satisfactory, providing the height H of the notch 17 is sufficient to maintain stress when the material of the ridge 16 is deformed by the application of stress to a fiber. The block 14 is preferably made of a hard plastic, Delrin ®. This plastic deforms more readily than glass; thus, when the ridges are pressed onto a glass fiber the ridges have been found to deform a small amount. It is preferable that for the required amount of pressure to cause complete power transfer, that the ridges not deform so much as to become flat such that stress is uniformly exerted all along the fiber. It is preferable that there be periodic regions of stress and no stress in the fiber. In a preferred embodiment disclosed in the above-referenced copending application, each of these regions are an exact odd multiple of one-half beat length in width to maximize the coupling. Incomplete power transfer will result if this geometry is not achieved but some coupling might still occur depending upon the exact geometry and force applied.

It has been found that a slightly deformable material, such as plastic, is preferable to a hard metal for the ridges 16, because a hard metal ridge will not deform as much when pressure is applied creating the danger that the ridge might break the fiber. Deformability of the ridge lessens this danger.

Returning to FIG. 1, the block 14 has a plurality of holes 20 which are spaced in a pattern to receive a set of pins 22 projecting from the flat surface 10 in a matching pattern. The block 14 may be slid toward and away from the flat surface 10 along the pins 22. The pins are so aligned that the edges of ridges 16 are transverse to the longitudinal axis of a fiber 24 which is held on the flat surface 10 by a pair of fiber holding plates 26. Thus, the longitudinal axes of the ridges 16, illustrated by the reference numeral 27 in FIG. 2, are transverse to the longitudinal axis of the fiber 24. The pins 22 also serve to prevent rocking of the block 14 to prevent uneven pressure from being applied to the fiber 24.

The fiber holding plates 26 are rotatable relative to the flat surface 10 by virtue of being mounted in a pair of circular apertures formed in a pair of end plates 28. The holding plates are rotatable to allow the fiber to be rotated such that one of the principal axes of birefringence in the fiber can be oriented at an angle to the direction of the applied force exerted by the ridges 16, as explained in more detail below. An angle of 45° is preferred in the invention disclosed in the copending application, because maximum shifting of the axes of birefringence for a given force is obtained at that angle. The end plates 28 are mounted to the block 11, at the ends thereof, so that the plates 28 are perpendicular to the flat surface 10.

Referring to FIGS. 4(a)–4(g), there is shown a diagram of the stress regions in the fiber 24 when the block 14 is pressed down with a total force F, so that the fiber 24 is squeezed between the surfaces 18 of the ridges and the surface 10 of the lower block. Also shown in FIGS. 4(b)–4(g) are vector diagrams of the amount of optical power above each of the axes of birefringence, i.e., polarization modes, at various points along the fiber. Referring also to FIG. 5, there is shown a diagram of how the axes of birefringence of the fiber 24 are changed by the application of stress. Those skilled in the art will understand that a single mode birefringent fiber, such as the fiber 24, has two orthogonal axes of polarization which correspond to the two orthogonal polarization modes of a single mode fiber.

FIG. 4(a) shows three regions of alternating stress and no stress caused by two of the ridges 16. Each of the stressed regions 30 and 32 is one-half beat length long in this embodiment. The same is true for the unstressed region 34. The fiber 24 can be thought of as a four-port device analogous to a directional coupler coupling dissimilar waveguides. For example, the two orthogonal X and Y polarization modes of the fiber 24, shown schematically at 36, are analogous to the two input ports of such a directional coupler. Similarly, the X and Y orthogonal polarization modes, shown schematically at 38, are analogous to the output ports of such a directional coupler.

When stress is applied to the fiber 24, as represented by the force F in FIG. 5 pushing the surface 18 against the birefringent fiber 24, at an angle $\phi$ relative to the Y axis, the orthogonal axes of polarization X and Y (which correspond to the polarization modes X and Y) abruptly shift through an angle $\theta$ to orthogonal axes of polarization X' and Y'.

It is important to the operation of this coupler device that abrupt changes in the orientation of the polarization mode axes be caused so that such changes in orientation occur over a very short boundary region. If the change in orientation is due to a gradual rotation of the axes of polarization over a relatively long distance, there would not be a significant power transfer between the polarization modes because the resultant polarization vector would merely follow the gradual shift in the axes of polarization, and substantially maintain its position relative thereto. In the embodiment shown, the boundaries, represented by the dashed lines 40, 42, 44, 46 in FIG. 4(a) are located at the edges of the relief areas 16, and thus, are periodically spaced at one-half the beat length. In other embodiments, the boundaries could be spaced at odd multiples of one-half the beat length.

FIGS. 4(b)–4(g) show how these abrupt boundaries 40, 42, 44 and 46 in the fiber 24 cause power transfer.

The electric field vector for the X-polarization mode (which corresponds to the X axis of polarization in a birefringent fiber) is labeled X in the unstressed region 34, and X' in the stressed regions 30, 32. Similarly, the electric field vector for Y-polarization mode (which corresponds to the Y-axis of polarization) is labeled Y in the unstressed region 34, and Y' in the stressed regions 30, 32. It will be understood that the X and X' vectors (FIGS. 4(b)–(g)), correspond to the X and X' axes (FIG. 5) of polarization, respectively, and the Y and Y' vectors (FIGS. 4(b)–(g)) correspond to the Y and Y' axes (FIG. 5) of polarization, respectively.

In FIG. 4(b) the input light is represented by the vector 48 as entering the fiber 24 with all power in the X polarization mode. This polarization is maintained as the light propagates up to the boundary 40 at the beginning of the first stressed region 30.

FIG. 4(c) shows the power components after the light has propagated just beyond the boundary 40 into the stressed region 30. At the boundary 40, the axes of polarization X and Y abruptly shift through an angle $\theta$ (FIG. 5) to a new orientation X' and Y', as discussed above in reference to FIG. 5. These new polarization mode axes X' and Y' represent the orientations of the electric field vectors for the electromagnetic light waves traveling in these polarization modes. As in the X and Y orientation case, the light in the X' mode travels at a different velocity than the light in the Y' mode, since that is fundamental to the concept of birefringence. The overall polarization of the light then is the resultant vector based upon the components of power in the X' and Y' or X and Y axes.

It will be noted that in the stressed region 30, there first appears at the boundary 40 a component of power in the Y' polarization mode whereas before the boundary 40 there was no power in the Y mode. The reason for this stems from Maxwell's equations which are well known mathematical relationships which explain the behavior of electromagnetic field at boundaries. A fundamental principle is that, at an abrupt boundary through which an electromagnetic field passes, the orientation and magnitude of the electric field vector, relative to a fixed observer, must be the same on either side of the boundary. In this case, the resultant polarization, i.e., the orientation of the electric field vector to the left of the boundary 40, is as shown by the vector 48 in FIG. 4(b). To the right of the boundary 40, the polarization axes X' and Y' are shifted so that in order to maintain the resultant polarization for the vector 48, there must be a small Y' component because X' is shifted from its orientation in the X mode. Thus, some power is transferred from the X mode into the Y' mode at the boundary 40.

As the two Y' and X' components travel through the stressed region 30 they shift in relative phase by 180 degrees because the stressed region is one-half beat length long. The relative phase of the X' and Y' components at the left of the boundary 42 is as shown in FIG. 4(d). The 180 degree phase shift is modeled by reversing the direction of the Y' component. The same result would be obtained if the 180° phase shift was modeled by reversing the direction of the X or X' vector and leaving the Y or Y' vector unchanged. As a consequence of this 180° phase shift, the resultant polarization vector 50 is shifted from the orientation of the vector 48.

At the boundary 42, the orientation of the polarization axes X' and Y' abruptly shifts back to the original orientation X and Y by virtue of the removal of stress. As the light travels across the boundary 42, the polarization represented by the vector 50 must be preserved. The situation to the right of the boundary 42, at the beginning of the region 34, is as shown in FIG. 4(e). However, because the shifting of the axes of polarization cause a concomitant shift in the direction of the component vectors representing power in the X and Y modes, the magnitude of the X and Y components must change to preserve the angle and magnitude of the overall electric field vector 50. By comparing FIGS. 4(b) and 4(e), it will be noted that the regions 30, 34 have caused a substantial increase in the magnitude of the Y component of power.

FIG. 4(f) represents the power components just to the left of the boundary 44 ending the unstressed region 34. The unstressed region 34 is also one-half beat length long and thus there will be another 180° phase shift between the X and Y components as they travel through the region 34. This phase shift is again modeled by reversing the direction of the Y component at the boundary 44, as shown in FIG. 4(f). By extension of the above discussion, it is apparent that the polarization axes will shift abruptly again at the boundary 44, from the X and Y orientation, back to the X' and Y' orientation (FIG. 5). This causes more power to be shifted into the Y' polarizatin mode, and it can be seen from FIG. 4(g) depicting the situation just right of the boundary 44, that to preserve the magnitude and angle of the resultant electric field vector 52 across the boundary 44, the magnitude of the Y' component in FIG. 4(g) must increase because of the shift in the angles of the X and Y axes to X' and Y'. Thus, it is seen that each boundary at an odd multiple of one-haf beat length causes a certain amount of power to be coupled from one mode to the other. The power coupled at the boundaries 40,42,44,46 is additive, so that total amount of coupled power from one end of the fiber 24 to the other is cumulative. If the boundaries were other than at exact odd multiples of one-half beat length, the cumulative coupled power might still be nonzero, but each boudary at other than an odd multiple of one-half beat length might cause power to be coupled into the other mode which has a component which is out of phase with the power already coupled into the other mode. This out of phase coupled power would cancel some of the power already coupled. Whether the net coupled power was nonzero would depend upon the exact locations of the boundaries and how much force was applied in each stressed region. In general, however, errors of e.g. on the order of 5-10% in the location of the boundaries may be tolerated without having a substantial adverse effect on the operation of the invention.

The system can be characterized mathematically as follows. Typically, for highly birefringent fiber, light propagating down one of the axes will not couple appreciably to the other axis. It has been demonstrated that an additional birefringence can be induced by applying pressure to the fiber. This birefringence is given by $$\Delta n_p = \frac{an^3 Cf}{2d} \quad (1)$$

where a is a constant equal to 1.58 for round fiber, n is the mean refractive index of the fiber, C is a piezooptical (or photoelastic) coefficient, f is the force per unit length applied to the fiber and d is the fiber cladding diameter. In calculations, the values $n=1.46$, $C=5\times 10^{-12}$ (MKS), and $d=65$ μm were used. For small forces the additional birefringence can be treated as a perturbation to the fiber's normal birefringence. For the purpose of analysis it is assumed that the applied force is at 45° to the fiber axes of birefringence (i.e., $\phi$ in FIG. 5 equals 45°). Applying the force at an angle of 45° to an axis of birefringence causes the maximum shift in the orientation of the birefringence axes per unit force for the disclosed embodiment of the copending application. However, the angle is not critical and deviations from 45° can be adjusted for by increasing the applied force. The first order result of the perturbation of birefringence is rotation of the fiber's original axes of birefringence through a small angle. This small shift in birefringence does not significantly change the magnitude of the total fiber birefringence, $\Delta n$. The angle $\theta$ is given by $$\tan(2\theta) = \frac{\Delta n_p \sin(2\phi)}{\Delta n_i + \Delta n_p \cos(2\phi)} \quad (2)$$

Where $\phi$ is the angle at which the pressure is applied with respect to the fast axis (i.e., the Y axis in FIG. 5); $\Delta n_i$ is the intrinsic birefringence of the fiber; and $\Delta n_p$ is the induced birefringence as calculated in Equation (1).

Light originally polarized along the X axis will decompose into components polarized along the axes X' and Y' when entering a squeezed region. The relative phase of the light in the two polarizations will change by $\pi$ radians in one-half beat length (i.e., L/2). If at this distance the force on the fiber is removed, the light will decompose back into components along the original axes with an amount $\cos^2(2\theta)$ in the X polarization and $\sin^2(2\theta)$ in the Y polarization. After traveling another L/2 distance the proper phase relationship in the two axes will be established such that a second stressed region will cause further power transfer. For a single L/2 length stressed region and L/2 unstressed region, a Jones matrix, T, can be written to describe the amplitude polarization transformation of this structure $$T = \begin{bmatrix} -\cos 2\theta & \sin 2\theta \\ -\sin 2\theta & -\cos 2\theta \end{bmatrix} \quad (3)$$

Repeating such a structure N times yields a total polarization transformation matrix $$T^N = \begin{bmatrix} (-1)^N \cos 2N\theta & (-1)^{N+1} \sin 2N\theta \\ (-1)^N \sin 2N\theta & (-1)^N \cos 2N\theta \end{bmatrix} \quad (4)$$

Therefore, complete coupling from one polarization to the other can be achieved by applying a force, F, to the N ridges such that $2N\theta = \pi/2$. For large N, (e.g., $N>5$), this optimal force is given by $$F \sim \frac{L\sqrt{2}\, \Delta n d\pi}{4an^3 C} \quad (5)$$

For example, if $N=10$ and $L=32$ millimeters, using the numbers given above, a force of 177 grams would be needed for complete coupling.

In the device depicted in FIG. 1, the protective fiber jacket was removed from the fiber 24 to expose the cladding of the fiber directly to the ridges. This may not be necessary in all cases.

Figure 6:
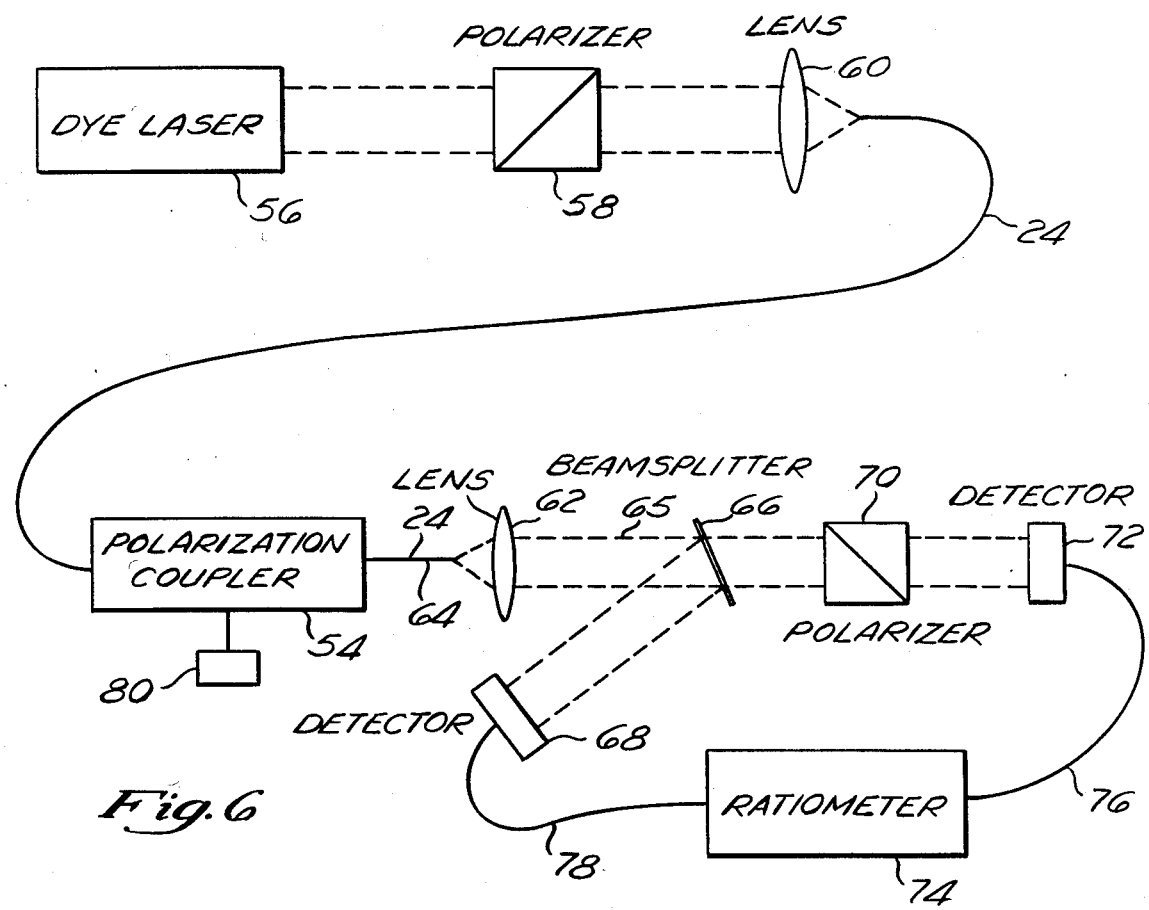
FIG. 6 is a diagram of a system using the coupler of FIG. 1.
Figure 7:
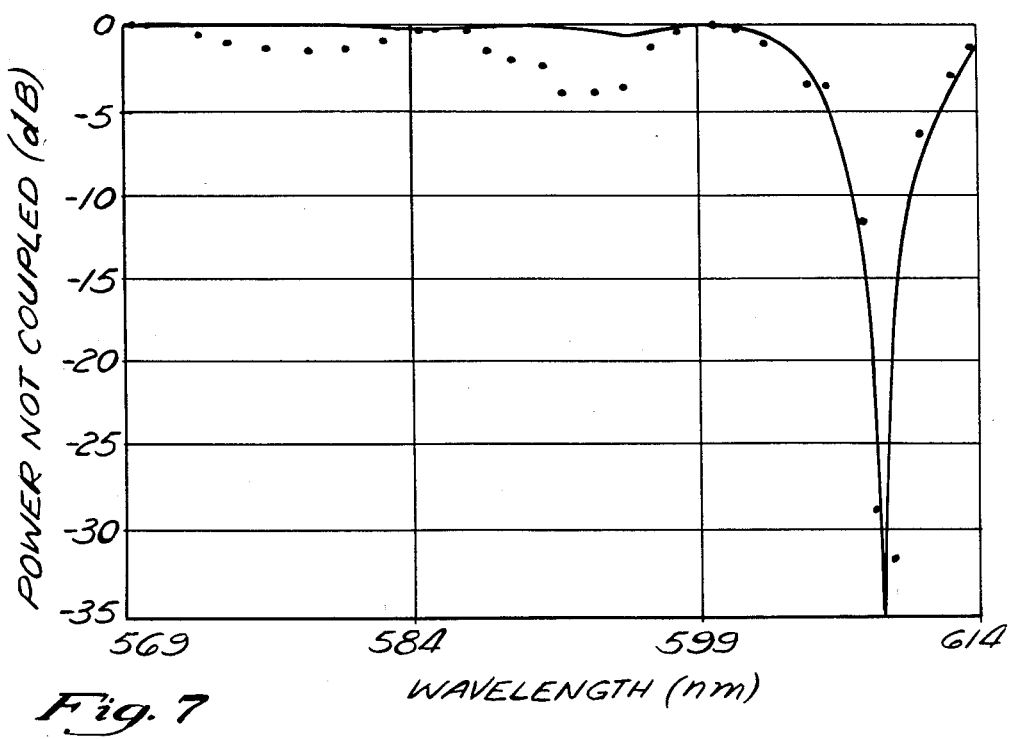
FIG. 7 is a graph of the experimentally determined coupling versus wavelength function compared to the theoretically predicted result for the coupler of FIG. 1.

FIG. 6 shows a system using the polarization coupler described above in reference to FIGS. 1-5, labeled with the numeral 54. A frequency tunable dye laser 56 was used to generate the source light. This light, polarized by a standard polarizer 58, is launched into a length of elliptical core birefringent fiber 24 by a lens 60 which focuses the polarized light onto the core of the fiber. The polarizer 58 is aligned to pass light into only one of the two orthogonal polarization modes of the fiber 24. The light propagates into the fiber 24, through the polarization coupler 54, and has some or all of its power coupled into the other orthogonal polarization mode, upon exiting the fiber 24 at the fiber segment 64. A lens 62 collimates light emerging from the output fiber segment 64 and causes a beam 65 thus formed to fall on a beam splitter 66. The beam splitter 66 causes part of the beam 65 to be directed to a standard photodetector 68 and the remaining part of the beam 65 is passed through a polarizer 70. The polarizer 70 only passes light of the same polarization relative to the polarization established by the polarizer 58. The light passed through the polarizer 70 is impressed upon a standard photodetector 72. The outputs of the photodetectors 72 and 68 are input, by lines 76, 78, respectively, to a standard ratiometer 74 which indicates the relative power in the orthogonal polarization compared to the total output power. With the polarizer 70 at the output, an extinction ratio between the fiber polarizations of between 19 and 32 dB was measured. The extinction ratio is the logarithm to the base 10 of the ratio of the optical power in the vertical polarization mode to the optical power in the horizontal polarization mode. An extinction ratio of at least 19 dB was achieved regardless of wavelength when the wavelength was changed. It is believed that this limit is set by scattering loss in the fiber (>150 dB/km), because some of the scattered light remains guided. At certain wavelengths, the ratio improved up to 32 dB, probably due to destructive interference of the scattered light. When the ridged block 14 was placed on the fiber and pressure was applied, a coupling ratio greater than 32 dB was achieved, typically with a force of about 220 grams. The coupling ratio is the logarithm to the base 10 of the ratio between the optical power not coupled to the orthogonal polarization mode and the power that is coupled into the orthogonal mode. This ratio was observed with 10 ridges at 633 nm and with 30 and 60 ridges at about 608 nm light wavelength.

The ridges of the coupler of FIG. 1 must be designed for a particular wavelength, because the beat length of the light in the fiber is not constant as a function of wavelength. When the device is used at a different wavelength, the phase shift, $\Delta\Phi$, over a ridge length changes from $\pi$ radians to $\pi + 2\delta$ radians. Consequently, complete power transfer can no longer take place. Assuming proper force applied by each ridge so that $2N\theta = \pi/2$, the transfer matrix over a single ridge and gap period becomes $$T = \begin{bmatrix} \sin^2\theta - \cos^2\theta e^{i2\delta} & \sin\theta \cos\theta [1 + e^{i2\delta}] \\ -\sin\theta \cos\theta [1 + e^{-i2\delta}] & \sin^2\theta - \cos^2\theta e^{-i2\delta} \end{bmatrix} \quad (6)$$

If the light is originally launched in only one polarization, after N ridges the power coupled into the second polarization is given by $|\kappa|^2$, where $$\kappa = -\sin\theta \cos\theta [1 + e^{-i2\delta}] \left[ \frac{\sin(N \cos^{-1} b)}{\sqrt{1 - b^2}} \right] \quad (7)$$

where: $b = \sin^2\theta - \cos^2\theta \cos^2\delta$.

The off-diagonal elements of the transfer matrix represent the amount of amplitude coupling which will occur between polarization modes. This amplitude coupling, $\kappa$, is the value of each of the two off-diagonal matrix elements of $T^N$.

The dependence of coupling on wavelength was investigated experimentally using a dye laser tunable between 569 nm and 614 nm. The device used was a 60 ridge coupler whose center wavelength was at 609 nm, to which uniform optical pressure was applied. The experimental setup was the same as shown in FIG. 6. The light left in the original polarization, i.e., not coupled, was the detected signal. The ratiometer 74 was used to compensate for laser power fluctuations as the wavelength was changed. The results are plotted in FIG. 7, which shows experimental results as dots, and the theoretical predicted results, based upon the abrupt shift in birefringence model assumed for the system, as a solid line. The good agreement between the two curves supports the conclusion that the changes in birefringence at the boundaries of the stressed regions are indeed abrupt. A full width at half maximum, which is theoretically equal to approximately $\lambda/N$, was observed to be 9 nm. However, the side lobes were higher than predicted due to uneven pressure of the ridges on the fiber. This unequal pressure was probably caused by variations in the fiber diameter and ridge height on the order of angstroms, and can be dealt with by constructing individually weighted ridges.

The polarization coupler described with reference to FIGS. 1-7 above can be used as an amplitude modulator. By varying the force F in FIG. 4(a) in accordance with a modulating signal, a varying amount of power can be coupled from the X polarization mode to the Y polarization mode where the amount of coupling is proportional to the magnitude of the force F. That is, if any conventional transducer 80 in FIG. 6 is driven e.g. sinusoidally to vary the force F applied to the ridged block 14 of the polarization coupler 54, the optical power in the Y polarization mode of the fiber 24 will be directly proportional to the magnitude of the force F, where the input power is launched initially all in the polarization mode X. This can be seen from Equation (1) where it is seen that the additional birefringence induced by the stress is directly proportional to the force applied per unit of length. When the force varies, the angle through which the axes of the polarization modes shift changes per Equation 2. This changes the amount of power shifted between the polarization modes by changing the amount of power decomposing onto each of the new axes at each boundary as will be apparent from inspection of FIGS. 4(b)-4(g).

Figure 8:
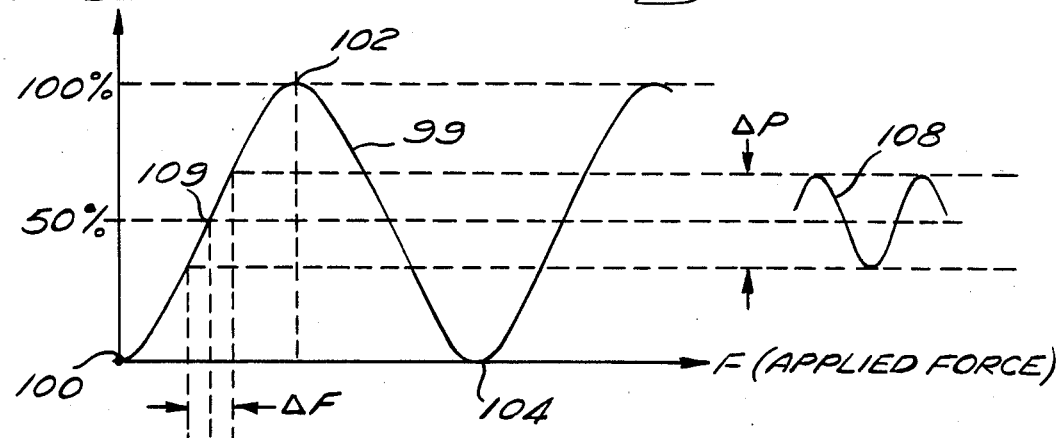
FIG. 8 is a graph of the coupled power versus the applied force for the device of FIG. 1.

As set forth above, the apparatus disclosed in FIG. 1 can be advantageously used as an amplitude modulator by driving the force shown in FIG. 4(a) with a time-varying signal. The principal of operation is illustrated by the graph in FIG. 8 which shows a coupling curve 99 relating the applied force on the horizontal axis to percent of coupled power on the vertical axis. The applied force on the horizontal axis is the force F applied to the ridged block 14 in FIG. 4(a). As the applied force is increased, the percent of power coupled from one polarization mode to the other polarization mode increases until substantially 100% of the power is transferred from the original mode into the other mode. This is illustrated in FIG. 8 by the sinusoidal appearing curve from reference numeral 100 to reference numeral 102. If the applied force is increased beyond the magnitude corresponding to reference numeral 102, overcoupling will occur and the coupled power will consequently decrease as illustrated on the curve from reference numeral 102 to reference numeral 104. Although the curve from reference numeral 100 to reference numeral 102 is substantially sinusoidal, a segment of the curve centered around 50% coupled power is substantially linear. This is represented by point 109 on coupling curve 99. Thus, if the applied force is varied about the magnitude corresponding to 50% coupling, the percent of coupled power will vary substantially linearly in proportion to the variation in applied force.

In FIG. 8, curves 106 and 108 illustrate the effect of a time-varying force, $\Delta F$ (curve 106) and the resultant time-varying coupled power, $\Delta P$ (curve 108). The variation in the coupled power can be detected as a variation in the signal level detected by photodetector 72 in FIG. 6. The polarizer 70 in FIG. 6 can be adjusted to pass light of either the same polarization relative to the polarization established by polarizer 58 or the orthogonal polarization. If selected for the same polarization, the detected signal level will decrease as the applied force increases, and vice versa. If the polarizer 70 is selected to pass light in the orthogonal polarization mode, the detected light level will increase as the force increases, and vice versa.

Figure 9A:
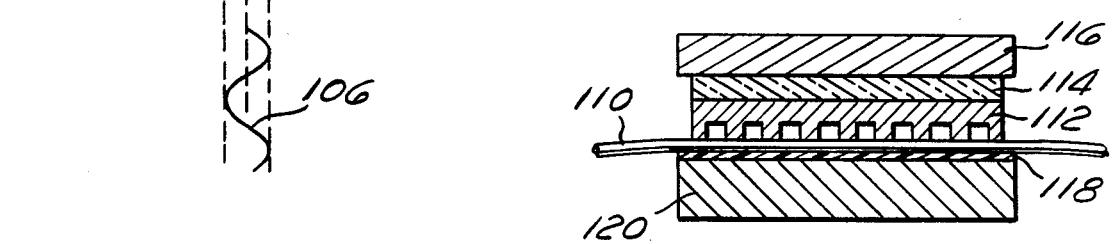
FIGS. 9(a), 9(b) and 9(c) are three configurations for obtaining modulation of polarization in a birefringent fiber by varying the pressure of the ridges on the fiber.
Figure 9C:
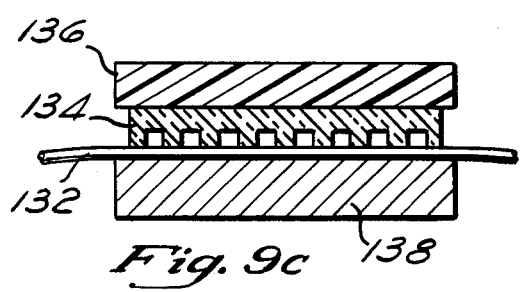
Figure 9B:
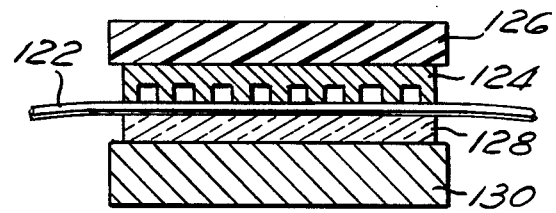

FIGS. 9(a), 9(b) and 9(c) illustrate three embodiments for obtaining modulation of polarization coupling in birefringent fiber by varying the pressure of the ridges on the fiber. In FIG. 9(a), the amplitude modulator comprises a machined block of aluminum 112, having the ridges described above, that are pressed down onto a fiber 110 by a piece of lead zirconate titanate (PZT) 114 that is above it. In one embodiment, there are 19 ridges on the machined block of aluminum 112, each of 0.457-mm width and 0.406-mm spacing, so that the 0.863 mm, is one beat length. A piece of Mylar ® sheet material 118 between the fiber 110 and a flat plate 120 underneath serves to insulate the positive voltage on the PZT 114 from ground. It also provides a spongy layer into which the fiber can be pressed so that breakage is reduced and improved contact between the aluminum ridges 112 and the fiber 110 is achieved. A static force is applied to the two aluminum plates 116, 120 to provide the static biasing of the device as described above. An oscillating electrical signal is applied to the PZT material 114 to provide the time-varying modulation of the optical signal. The apparatus of FIG. 9(a) has a resonant frequency of approximately 29 kHz and is operable to frequencies above 350 kHz.

In order to increase the maximum operating frequency of the device, a configuration such as that shown in FIG. 9(b) or FIG. 9(c) is desirable. The configuration of FIG. 9(b) comprises a plastic top plate 126 of Delrin ® plastic or other similar material over a ridged aluminum block 124, such as in FIG. 9(a). However, a PZT material 128 is placed beneath a fiber 122 and does not have to move the mass of the ridged block 124. The coupler of FIG. 9(b) operates in excess of 1.5 MHz.

As illustrated in FIG. 9(c), the ridges may, alternatively, be cut directly into a PZT material 134, and the PZT material 124 applied directly to a fiber 132. As in all configurations, a static force is applied to an upper plate such as a plate 136 in FIG. 9(c) and a lower plate such as a plate 138 in FIG. 9(c) to bias the coupling of the fiber at the approximate 50% point. Further discussion relative to the devices of FIGS. 9(a–c) can be found in "Active polarization coupler for birefringent fiber," J. L. Brooks, et al., *Optics Letters*, Vol. 9, No. 6, June 1984, pages 249–251.

In each of the above-described devices, the ridges should preferably be precisely machined into the ridged block, whether PZT material or aluminum, in order to distribute the stress evenly down the longitudinal axis of the optical fiber. Furthermore, the block of PZT material must be such that the time-varying modulation is applied evenly. Furthermore, the frequency response of the modulator configured in accordance with FIG. 9(a), FIG. 9(b) or FIG. 9(c) is limited by the acoustic resonance of the PZT material.

THE EMBODIMENTS OF THE PRESENT INVENTION

Figure 10:
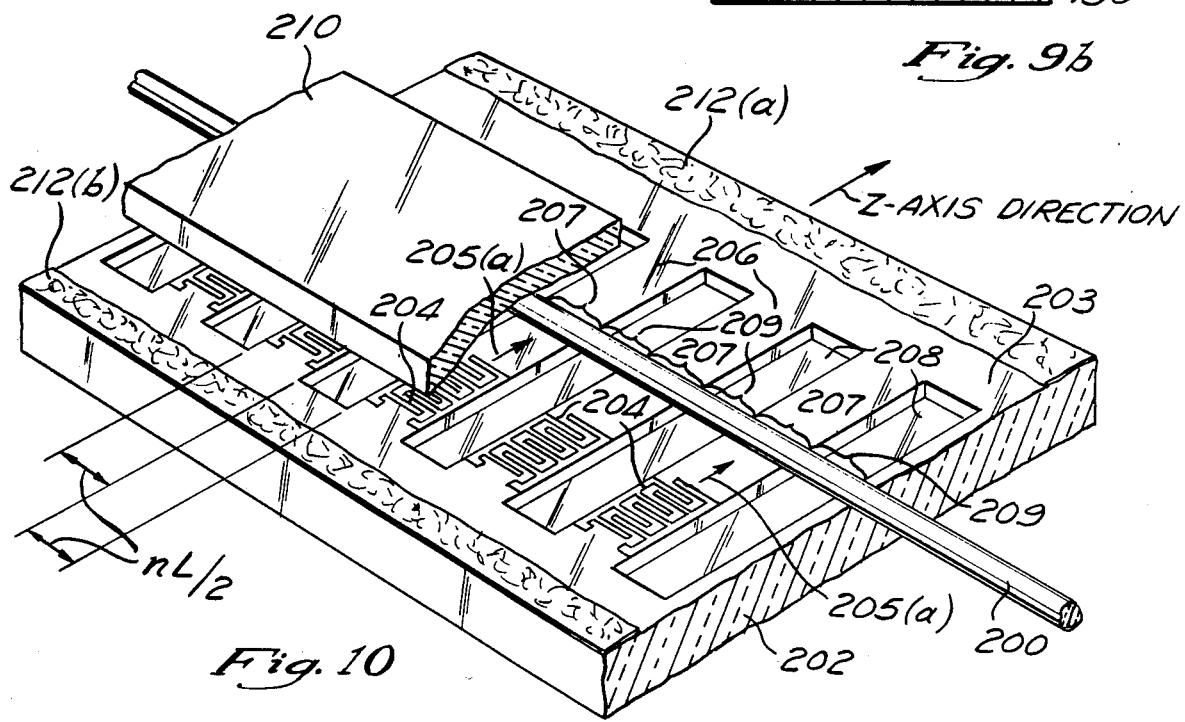
FIG. 10 is a preferred embodiment of the present invention.

FIG. 10 illustrates a preferred embodiment of the present invention. A birefringent optical fiber 200, having an elliptical core as described above or having intrinsic birefringence induced by stress or other means, is placed on a planar surface 203 of an anisotropic crystal substrate 202 such as Y-cut lithium niobate (LiNbO$_3$), having a thickness of approximately 2 mm. The fiber 200 is oriented perpendicular to the Z-axis of the lithium niobate 202. The lithium niobate substrate 202 is a piezoelectric material in which surface acoustic waves, having a propagation velocity of approximately 3480 meters per second along its preferential axis of propagation (i.e., the Z-axis), can be induced by subjecting portions of its surface to an oscillating voltage. To generate the surface acoustic waves, a plurality of acoustic transducers 204 are attached to the surface 203 of the substrate 202.

A typical acoustic transducer 204 is shown in more detail in FIG. 11(a). Bonding pads 204(a) and 204(f) are electrically connected to interleaved electrodes or fingers 204(b–e) and 204(g–j), respectively. The fingers 204(b–e), 204(g–j) have a width (W$_f$) of 200 micrometers and have a spacing (S$_f$) of 200 micrometers to form an interdigital transducer. Thus, the center-to-center spacing, $d_{c-c}$, of the fingers is 400 micrometers. The pads and fingers may be placed on the lithium niobate substrate 202 by metallic deposition or etching such as done in the semiconductor thin film or photolithography arts. An oscillating voltage is applied to the bonding pads 204(a) and 204(f), thus causing a varying electric field to be applied between adjacent fingers of the transducer 204. As is well-known in the art, the electric field causes piezoelectric stress in the lithium niobate substrate 202 and results in a surface acoustic wave being generated between the fingers. A pair of surface acoustic waves travel away from the transducer 204 in the directions indicated by arrows 205(a) and 205(b) and propagate along the surfaces 203 (FIG. 10) of the lithium niobate substrate 202 (FIG. 10).

Although the frequency of the oscillating voltage can be varied, a preferable frequency is selected that generates an acoustic wave which has a wavelength equal to twice the center-to-center spacing of adjacent fingers. This is illustrated in FIG. 11(b) which shows an acoustic waveform 205, having a wavelength of 800 μm and travelling in the direction indicated by wave 205(a) in FIG. 11(a), pictorially superimposed on the extended centerlines of the fingers of transducer 204 of FIG. 11(a). Since the voltage between a finger-pair 204(b)/204(g) is the same as the voltage between a finger-pair 204(c)/204(h), if the acoustic wave 205 travels the distance between the finger-pair 204(b)/204(g) and the finger-pair 204(c)/204(h) in the same amount of time that the applied oscillating voltage completes a full sinusoidal cycle, the acoustic wave generated by the finger-pair 204(b)/204(g) will be synchronously reinforced by the stress caused by the voltage at finger-pair 204(c)/204(h), (i.e., the transducer 204 will be operating at its resonant frequency). Typically, the acoustic propagation velocity in lithium niobate is approximately 3480 meters per second. Therefore, an acoustic wave 205 with a wavelength of 800 μm corresponds to an acoustic frequency of 4.35 MHz (i.e., 3480 m/sec÷800 μm=4.35 MHz).

Further information on surface acoustic waves can be found in "UHF SURFACE ACOUSTIC WAVE RESONATORS", E. P. Staples, et al., 1974 *Ultrasonics Symposium Proceedings*, IEEE Cat. No. 74 CHO 896-1SU, pages 245–252; REFLECTIVE ARRAYS FOR SAW RESONATORS," Peter S. Cross, 1975 *Ultrasonics Symposium Proceedings*, IEEE Cat. No. 75 CHO 944-4SU, pages 241–244, "Surface-Acoustic-Wave Resonators," Peter S. Cross, et al., *HEWLETT-PACKARD JOURNAL*, December 1981, pages 9–17; "SURFACE WAVE RESONATORS," K. M. Lakin, et al., 1975 *Ultrasonic Symposium Proceedings*, IEEE Cat. No. 75 CHO 994-4SU, pages 269–278; and "S.A.W. REFLECTING ARRAYS," G. L. Matthaei, et al., *ELECTRONICS LETTERS*, Vol. 12, No. 21, Oct. 14, 1976, pages 556–557.

Returning to FIG. 10, the planar surface 203 of the lithium niobate substrate 202 further includes a series of spaced, parallel recesses or grooves 208, oriented parallel to the Z axis of the substrate 202 and thus normal to the fiber 200. The portions 206 of the surface 203 which are between the grooves 208 provide a series of spaced parallel ridges 206 each of which is aligned with one of the acoustic transducers 204 to receive an acoustic wave, such that the acoustic wave propagates in the longitudinal dimension of the ridges. Each ridge 206 has a width substantially equal to an odd multiple of one-half the beat length of the optical fiber 200 (i.e., the width equals nL/2 where n is an odd integer). The ridges 206 are separated by grooves 208 each having a width substantially equal to an odd multiple of one-half the beat length. Thus, the separation between corresponding locations on adjacent ridges 206 is a multiple of one beat length. Each ridge 206 acts as an acoustic waveguide to conduct the acoustic waves 205, in the direction represented by the arrow 205(a) of FIG. 11, to the fiber 200.

A flat pressure plate 210, such as a flat silicon plate, is applied to the optical fiber 200 in a position parallel to the surface of the substrate 202, so that the fiber 200 is sandwiched between the flat plate 210 and the ridges 206. Force applied to the flat plate 210 causes a spatially periodic stress on the optical fiber 200, as described above in reference to the device of FIG. 1, because of the ridges 206. Thus, the fiber 200 will be stressed where it is in contact with the ridges 206 (i.e., in stressed regions 207) and will be unstressed where it passes over the grooves 208 (i.e., in unstressed regions 209). The amount of force applied to the flat plate 210 determines the static biasing point of the fiber 200 as previously illustrated with respect to FIG. 8. A typical bias point is indicated by the reference numeral 109 in FIG. 8 at approximately 50% coupling.

In this invention, the ridged substrate 202 and the flat silicon pressure plate 210 are maintained in fixed relationship to apply a constant force which statically stresses the fiber 200 at the regions 207. Time varying stresses are applied to the fiber 200 by the acoustic waves 205. More specifically, one of the pair of surface acoustic waves (e.g., the wave in the direction of 205(a) of FIG. 11) generated by each of the transducers 204 causes small undulations in the surface of the lithium niobate substrate 202 which propagate along the ridges 206, in the direction indicated by arrow 205(a) in FIG. 10, to the fiber 200 to vary the pressure applied to the fiber 200. This is illustrated more clearly in FIG. 12 which shows a cross-sectional view of the fiber 200 on the substrate 202. The surface undulations caused by the surface acoustic wave 205(a) are shown (in increased size) as undulations 222. The variation in stress on the fiber 200 caused by the undulations 222 of the surface acoustic wave 205(a) may, for example, correspond to the sinusoid 106 in FIG. 8, so as to yield a resultant fluctuation in optical power in the coupled mode corresponding to the sinusoid 108 in FIG. 8.

As illustrated in FIG. 12, the optical fiber 200 may be fixedly attached to the lithium niobate substrate 202 and the flat silicon plate 210 by a cement such as an ultraviolet cured epoxy 218, 220, 221 applied sparingly. Preferably, most of the epoxy 218 should be applied on the side of the fiber 200 which is opposite the acoustic transducers 204 (FIG. 10) so that only a minimal amount of epoxy 220 is in the acoustic wave path between the fiber 200 and the acoustic transducers 204, in order to avoid altering the surface undulations 222 of the surface acoustic waves 205(a) generated by the transducers 204.

In order that the cumulative effect of the acoustic waves 205(a) on the fiber 200 be additive, the wave fronts from each of the transducers 204 in FIG. 10 should impinge on the fiber 200 substantially in synchronization. In other words, the peaks and the troughs of each acoustic wave should be in phase when they arrive at the fiber 200, so as to strike the fiber at substantially the same time. The interdigital acoustic transducers 204 are all attached to the same source of the oscillating electric voltage and are therefore synchronized. Furthermore, the fingers 204(b-e) and 204(g-j) of each of the interdigital acoustic transducers 204 (FIG. 11) are placed on the substrate 202 in substantial alignment, so that they are parallel to each other. Moreover, when the optical fiber 200 is placed on the lithium niobate substrate 202, it is oriented parallel to the fingers of the transducers 204. Thus, the acoustic waves strike the optical fiber 200 substantially synchronously.

The ridges 206 act as acoustic waveguides for the acoustic waves 205(a) generated by the transducers 204. Although the wave fronts of the acoustic waves may have a tendency to increase in width as the waves travel away from transducers 204, the ridges 206 advantageously control the width of the wave fronts striking the fiber, and thus prevent the acoustic waves from striking the fiber 200 outside the stressed regions. Thus, the widths of the wave fronts of the acoustic waves are determined by the widths of the ridges 206 and are therefore maintained at the same width as the stressed regions 207 of the fiber 200 caused by the pressure of the ridges 206. Therefore, the spatial periodicity of the effect of the acoustic wave fronts on the fiber 200 is aligned with the spatial periodicity of the stressed regions 207 and unstressed regions 209 of the fiber 200.

In one particularly preferred embodiment of the ridged device, the ridges 206 are cut into the lithium niobate substrate 202 to provide the ridge biasing and act as waveguides for the acoustic waves. As discussed above, the series of grooves 208 are cut between the transducers 204 such that the ridges 206 are in alignment with the acoustic transducers 204. The grooves 208 are cut to form the ridges 206 by conventional methods known in the art. The device further includes an absorber material 212(a) and 212(b) on the surface 203 of the substrate 202 on both sides of the device to prevent the reflection of the acoustic waves, thus preventing interference which can distort the wave fronts of the acoustic waves. The acoustic absorber material 212(a) is placed on the surface 203 on the side of the fiber 200 opposite the transducer 204 to absorb the energy remaining in the acoustic waves propagating in the direction 205(a) (FIG. 11) after the acoustic wave has passed beneath the fiber 200. The acoustic absorber material 212(b) is placed on the surface 203 on the side of the transducers 204 opposite the fiber to absorb the energy in the acoustic waves propagating in the direction 205(b) (FIG. 11).

In another particularly preferred embodiment of this device, the ridges 206 are formed by depositing an acoustically conductive material such as gold on the surface of the lithium niobate substrate 202. In this embodiment (not shown), the ridges 206 are built up on the planar surface 203 so that the grooves 208 are in the plane of the surface 203. Thus, the grooves 208 are the areas of the lithium niobate surface 203 between the ridges where no deposition has been made. As in the previously discussed embodiment, the ridges 206 act as waveguides for the acoustic waves generated by the transducers 204. However, it is the portion which is built-up on the surface 203 which forms the ridges 206. Alternatively, a common layer of gold can be deposited on the entire surface of the lithium niobate substrate 202 and the grooves 208 can be subsequently formed by removing the gold by conventional semiconductor etching techniques. Preferably, the interdigital transducers 204 and the ridges 206, which form the acoustic waveguides, are created by the same etching techniques.

Figure 13:
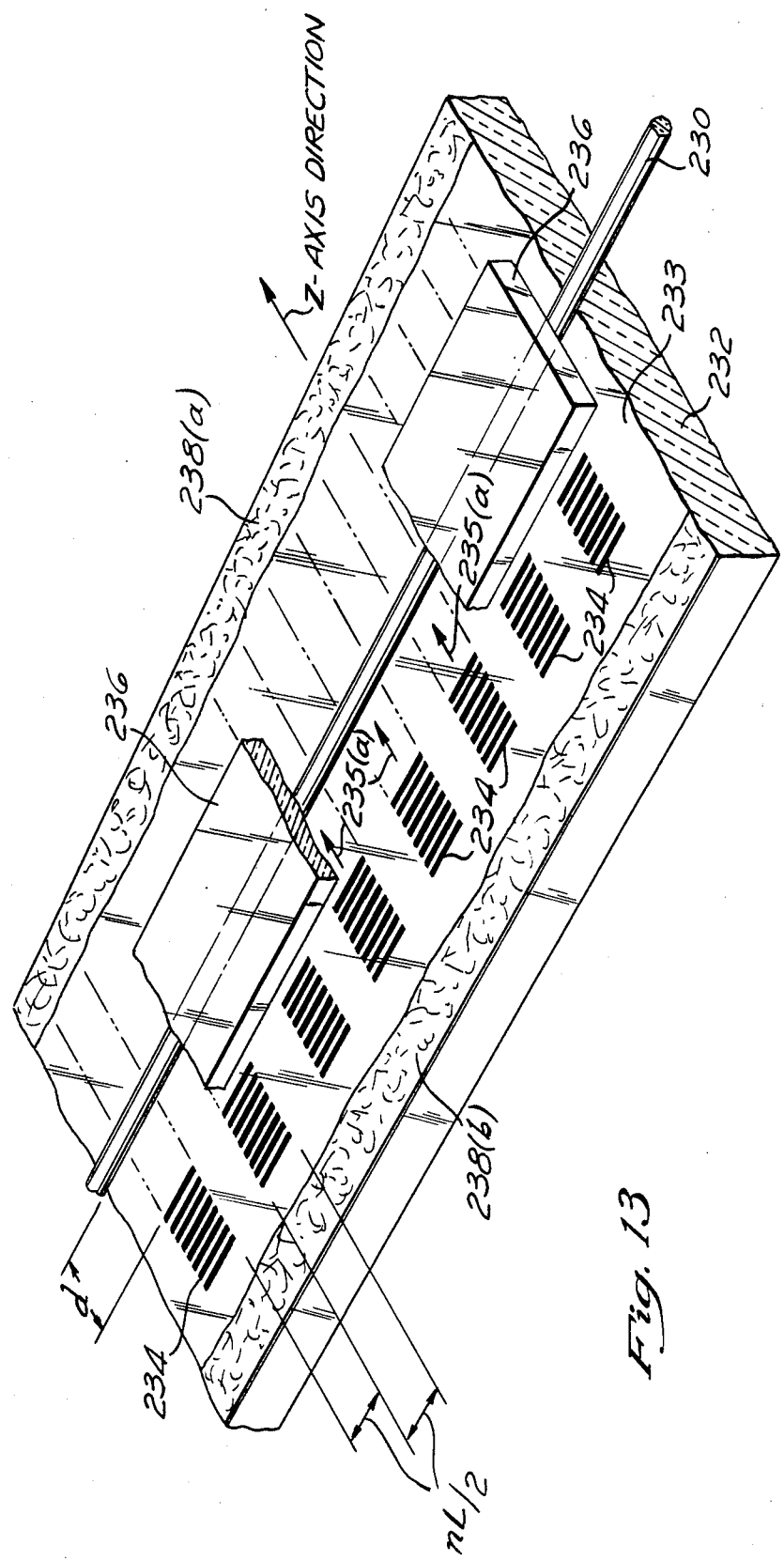
FIG. 13 is an alternative embodiment of the present invention.

Alternative embodiments of the invention which do not utilize ridges on either of the surfaces in contact with the optical fiber are shown and discussed in reference to FIGS. 13-20. Since there are no ridges to provide waveguides, it is particularly preferable in these embodiments to use an anisotropic substrate, such as lithium niobate, which preferentially conducts acoustic wave energy. The crystal lattice structure of the anisotropic material acts as a waveguide to conduct the waves in the desired direction. One of these embodiments is illustrated in FIG. 13. A birefringent optical fiber 230 is placed on a flat surface 233 of a lithium niobate substrate 232 perpendicular to the Z-axis of the substrate, as before, and pressure is applied by a flat pressure plate 236. However, neither the lithium niobate substrate 232 nor the flat pressure plate 236 has any grooves or ridges. By way of example, the flat pressure plate 236 may be a 15.73 mm long piece of polished silicon; however, other materials may be used to form the flat late, e.g. quartz crystal. The spatial periodicity required to produce efficient coupling between polarizations is created by using an array of surface acoustic wave transducers 234 which produce a series of acoustic beams which are an odd multiple of L/2 wide (i.e., nL/2 where n is an odd integer) and are separated by gaps which are an odd multiple of L/2 wide, where L is the beat length of the optical fiber 230. Thus, the distance between corresponding locations on adjacent transducers 204 is equal to a multiple of one beat length.

Figure 14:
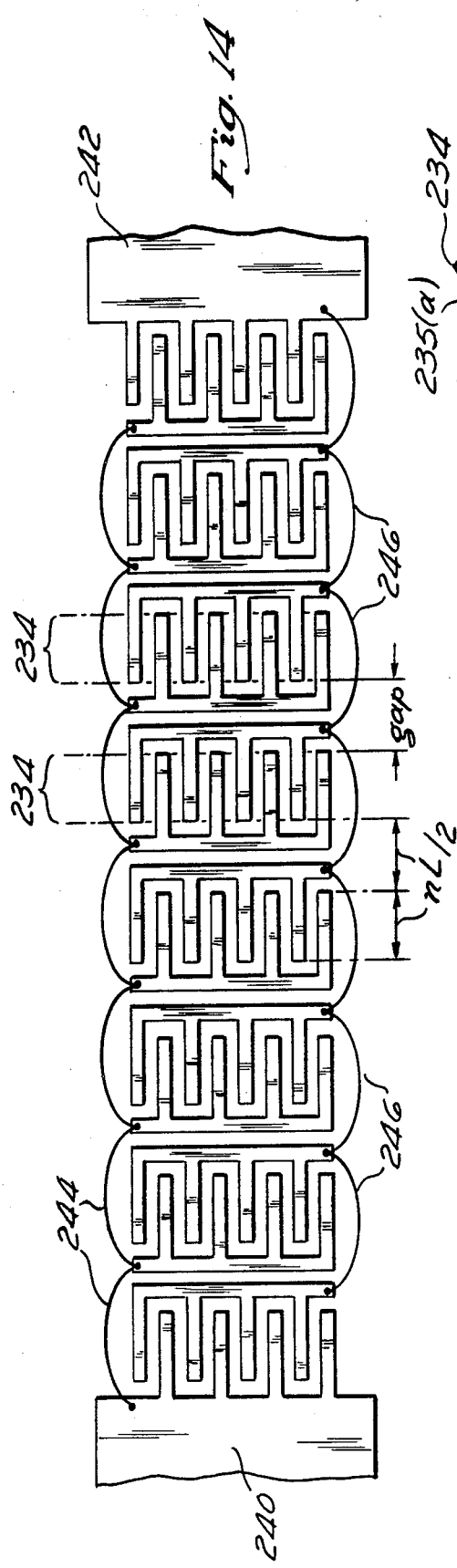
FIG. 14 is a plan view of the transducers of the embodiment of FIG. 13.

In the exemplary device of FIG. 13, eight interdigital transducers 234 are made by depositing interleaved, 200 micrometer wide, metal fingers on the lithium niobate substrate as illustrated in FIG. 14. The eight transducers 234 are oriented for Z-propagation, i.e., in the direction of the Z axis of the substrate 232, and therefore, normal to the longitudinal axis of the fiber 230. The transducers can be formed by creating a photolithographic mask on gold bonded on the substrate 232 and then etching away the unmasked portion, or by using thin film techniques conventionally used in semiconductor fabrication.

Figure 15:
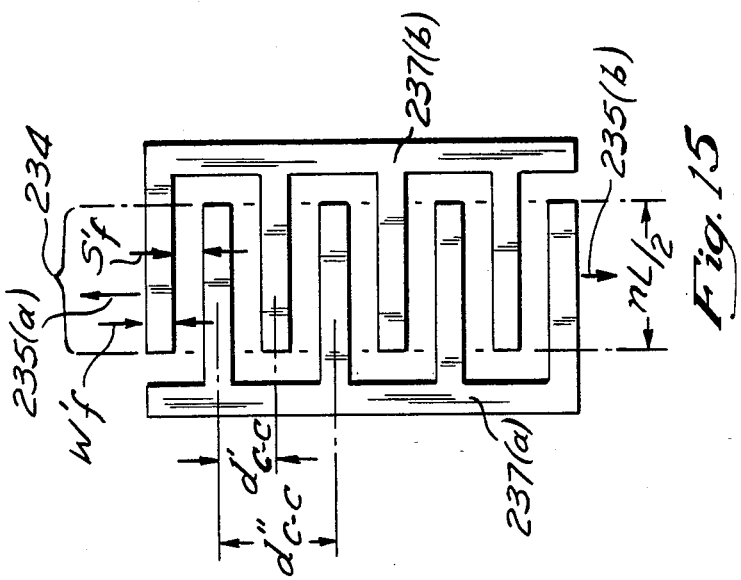
FIG. 15 is an enlarged view of one of the transducers of FIG. 14.

As illustrated in FIG. 15, each transducer 234 comprises two electrodes 237(a), 237(b), each electrode comprising a set of four electrically-interconnected fingers. The fingers of one set are interleaved with the fingers of the other set such that they overlap but do not touch. The length of the overlap between fingers of each set (shown as nL/2 in FIG. 15) is substantially equal to an odd multiple of one-half the beat length of the optical fiber 230. Each of the fingers has an exemplary width, $W'_f$, of 200 μm and is spaced from the adjacent finger by a distance, $S'_f$, of 200 μm. Thus, there is a 400 μm center-to-center spacing, $d'_{c-c}$, between adjacent fingers and an 800 μm center-to-center spacing, $d''_{c-c}$, between fingers which are electrically interconnected. As described in connection with the transducer 204 of FIG. 11, when an oscillating voltage source is applied to the transducer 234, an electric field is generated between adjacent fingers, thus stressing the lithium niobate substrate 232 and generating surface acoustic waves propagating in the directions indicated by arrows 235(a) and 235(b). The generated surface acoustic waves have wave fronts with widths equal to the length of the overlap (i.e., nL/2) and have a frequency equal to the frequency of the oscillating voltage source. As explained above in connection with FIG. 10, for the dimensions set forth, an oscillating voltage frequency of 4.35 MHz corresponds to the resonant frequency of the transducer and is therefore preferable, although other frequencies can be used.

Returning to FIG. 14, a conventional oscillating voltage source (not shown) is electrically connected to the transducers 234 by bonding pads 240 and 242. A plurality of wires 244 interconnect the electrodes 237(a) of the transducers 234 with the bonding pad 240, and a plurality of wires 246 interconnect the electrodes 237(b) of the transducers 234 with bonding pad 242. Thus, the acoustic waves generated by each transducer 234 are in fixed phase relationship with each other. A simple matching network (not shown) may be used to match the largely capacitive impedance of the transducer 234 to the impedance of the voltage source. The spacing (indicated as "gap" in FIG. 14) between the overlapped portions of adjacent transducers 234 is also chosen to be an odd multiple of one-half the beat length of the optical fiber (i.e., nL/2 where n is an odd integer). Thus, the generated acoustic surface waves will be separated by a distance equal to nL/2.

As shown in FIG. 13, the surface waves from each of the transducers 234 are conducted by the lithium niobate substrate 232 to the birefringent fiber 230 in the direction indicated by the arrows 235. As set forth above in connection with FIG. 10, the fiber 230 is preferably positioned with its longitudinal axis parallel to the aligned edges of the transducers 234. However, unlike the embodiment of FIG. 10 in which the ridges 206 control the width of the wave fronts as they impinge against the fiber, the acoustic wave fronts in this embodiment may have a tendency to increase in width. Therefore, the fiber 230 is preferably spaced apart from and parallel to the transducers by a distance, d, such that the acoustic wave fronts impinge upon the fiber 230 at the approximate junction of the Fresnel and Fraunhofer regions of the acoustic waves. As is well known, the length of the Fresnel region is determined by the geometry of the transducers 234, as well as by the wavelength of the acoustic waves generated by the transducers 234. In the Fraunhofer region, the wave fronts are better defined than in the Fresnel region, although the wave fronts tend to diverge rapidly after entering the Fraunhofer region, thereby decreasing their intensities and increasing the width of the wave fronts. The acoustic waves will be well defined at maximum intensity at the juncture between the Fresnel and Fraunhofer regions and in preferred embodiments of the invention, the fiber 230 is located at or near the juncture.

As shown in FIG. 13, an acoustic absorber material 238a and 238b is applied to the lithium niobate substrate 232 to absorb the acoustic surface waves after they pass the fiber 230, and to absorb the acoustic surface waves generated by the transducers 234 which travel away from the transducers 234 in the direction away from the fiber 230. Thus, the absorber material 238a and 238b prevents reflections of the surface acoustic waves from boundaries of the lithium niobate substrate 232 from interfering with the generated acoustic waves.

Since neither the flat silicon plate 236 nor the surface 233 of the substrate 232 have ridges or grooves, as in the previously described embodiment of FIG. 10, the coupling curve 99 of FIG. 8 is not applicable to the embodiment of FIG. 13. Instead, the stress caused by the pressure applied to fiber 230 between the flat silicon pressure plate 236 and surface 233 of the substrate 232 causes coupling between the propagation modes in accordance with the relationship illustrated by coupling curve 239 in FIG. 16.

Figure 16:
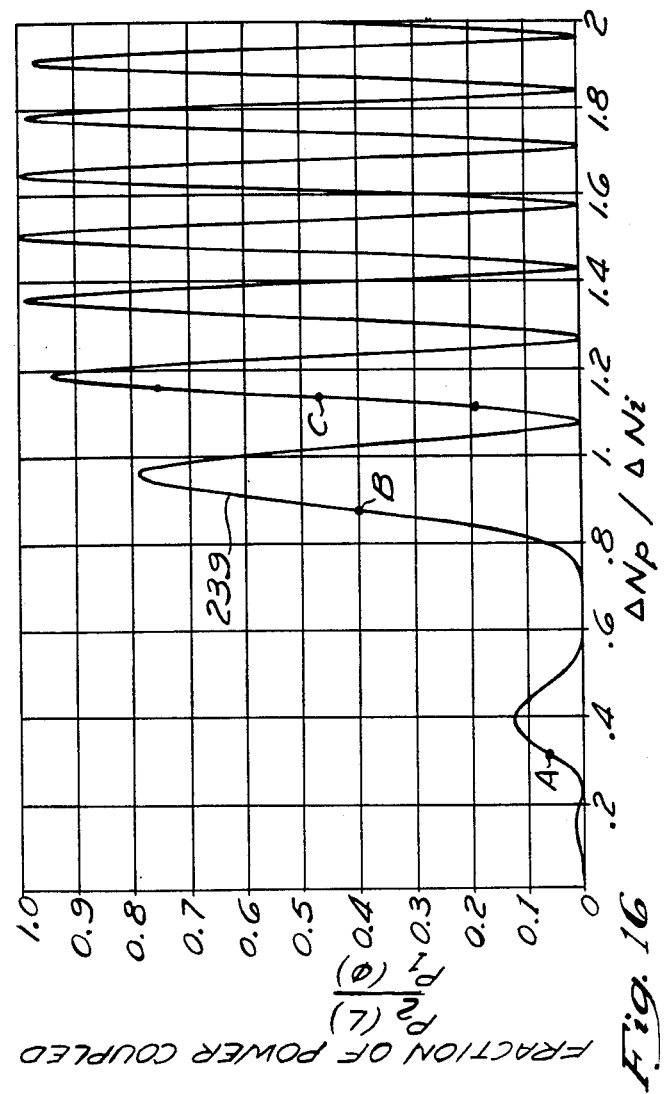
FIG. 16 is a graph of the fraction of power coupled versus the pressure induced birefringence for a flat plate modulator of the present invention.

The vertical axis of the graph in FIG. 16 represents the fraction of power coupled from one propagation mode to the other. For example, 1.0 on the vertical axis indicates that all of the power initial propagating in one mode is coupled to the other mode, and 0.5 indicates that one-half of the power initially propagating in one mode is coupled to the other mode.

The horizontal axis in FIG. 16 represents the force applied to the fiber 230 to cause coupling between the modes. Rather than show the applied force as an absolute magnitude which will cause a different effect depending upon a number of interrelated parameters, such as fiber size and orientation, the applied force is represented by the pressure induced birefringence of the fiber 230 as a fraction of the intrinsic birefringence of the fiber 230, i.e., $\Delta n_p/\Delta n_i$. The parameter $\Delta n_i$ represents the intrinsic birefringence of the fiber 230 which is the difference between the refractive indices of the two axes of the fiber in the absence of externally applied stress, which, in the exemplary fiber 230, is approximately $3.73 \times 10^{-4}$. The parameter $\Delta n_p$ is the additional birefringence induced by applying pressure to the fiber and is given by the equation:

$$\Delta n_p = an^3 Cf/2d \tag{8}$$

where a is a constant equal to 1.58 for round fiber, n is the mean refractive index of the fiber 230, C is a photoelastic coefficient, f is the force per unit length applied to the fiber 230, and d is the diameter of the fiber 230. For an exemplary elliptical core fiber from Andrew Corporation (as illustrated in FIG. 3) having an unjacketed cladding diameter, $d_{cladding}$, of 50 μm, and X and Y core axes with lengths, $d_{x\text{-}core}$ and $d_{y\text{-}core}$, of 2 μm and 1 μm, respectively, a typical value for C is $3.36 \times 10^{-12}$ meter$^2$/Newton.

As illustrated in FIG. 16, it is preferable that the pressure induced birefringence, $\Delta n_p$, of the fiber 230 (FIG. 13) be nearly equal to the intrinsic birefringence, $\Delta n_i$, to insure that a large fraction of the power is coupled from one mode to the other. Unlike the coupling curve 99 illustrated in FIG. 8 for the ridge-biased device, the coupling curve 239 of FIG. 16 for the flat plate biased device of the present invention is not periodic. Instead, curve 239 comprises a series of sinusoidally shaped lobes (lobe 1–lobe 8, etc.) which vary in magnitude along the vertical axis (i.e., the maximum fraction of coupler power) and slope (i.e., the change in fraction of coupled power per change in applied pressure). As illustrated by lobe 1, for relatively low applied stress (i.e., $\Delta n_p$ substantially less than $\Delta n_i$), the maximum fraction of coupled power is small (approximately 0.12 for $\Delta n_p/\Delta n_i$ equal to approximately 0.4). For increasing stress, the magnitude of the lobes becomes larger and the lobes become narrower so that the slope of the curve 239 increases. For example, on lobe 2, representing ranges of $\Delta n_p/\Delta n_i$ from approximately 0.8 to 1.1, the fraction of coupled power increases to approximately 0.75 before overcoupling occurs (i.e., before the coupled optical power begins coupling back to the original propagation mode, thus decreasing the fraction of coupled power with further increases in applied stress). On lobe 3, the coupled power increases until a maximum fraction of coupled power in excess of 0.9 is reached, at which point overcoupling occurs, causing the power to again decrease. The increase in coupled power from a minimum to the maximum for lobe 3 is achieved with a smaller increase in applied stress than is required to increase from minimum to maximum coupling on lobe 2. Thus, the slope of coupling curve 239 is greater on lobe 3 than on lobe 2. Lobe 3 corresponds to a range of $\Delta n_p/\Delta n_i$ from approximately 1.1 to 1.3. Further increases in applied pressure cause relatively minor increases in the slope of curve 239, and very little change in the maximum coupled power of curve 239, as illustrated by lobes 4–8.

The coupling curve illustrated in FIG. 16 is derived from the formula $$\frac{P_2(L)}{P_1(0)} = \tfrac{1}{2} \sin^2(2\theta)(1 - \cos(2\pi \Delta n' L/\lambda_0)) \tag{9}$$

where all the power is initially in mode 1, represented as $P_1(0)$. L is the length over which the static bias pressure is applied; $\lambda_0$ is the optical wave length; and $P_2(L)$ is the magnitude of power coupled to the orthogonal polarization mode. $\theta$ is the angle of rotation of the principal axes in the stressed region (measured relative to the fast axis in the unstressed region as shown in FIG. 12), and is given by the formula:

$$\tan(2\theta) = \frac{\Delta n_p \sin(2\phi)}{\Delta n_i + \Delta n_p \cos(2\phi)} \quad (10)$$

where $\phi$ is the angle at which the pressure is applied, (also measured relative to the fast axis in the unstressed region as shown in FIG. 12); $\Delta n_i$ is the intrinsic birefringence of the fiber; and $\Delta n_p$ is the pressure induced birefringence as defined above. $\Delta n'$ in Equation (9) is the value of birefringence in the stressed region (i.e., the region of the fiber 232 sandwiched between the upper plate 236 and the substrate 232 in FIG. 13) as given by the formula $$\Delta n' = (\Delta n_i^2 + \Delta n_p^2 + 2\Delta n_i \Delta n_p \cos(2\phi))^{\frac{1}{2}} \quad (11)$$

In most periodic polarization couplers, such as the ridged coupler of FIG. 1, changes in the fiber birefringence caused by pressure-induced stresses, and concomitant changes in the beat length of the fiber, can be neglected because the forces applied to the fiber are small enough that the rotation of the principal axis is the dominant effect. However, biasing the optical coupling by using a flat plate (without ridges) requires relatively high pressure against the fiber, such that changes in fiber birefringence are sufficiently large to significantly affect the fiber beat length. Thus, in the embodiment of FIG. 13, where a flat plate is used to apply pressure continuously along the fiber, across the plural acoustic wave paths, the effects of changes in the birefringence cannot be ignored.

The shape of the coupling curve 239 in FIG. 16 depends strongly on the angle at which the pressure is applied. In the present invention, shown in FIG. 13, the preferred angle at which to apply the pressure was determined by pressing the fiber 230 against the lithium niobate substrate 232 by using the flat silicon pressure plate 236, then translating the plate 236 horizontally to roll the fiber 230 until the optimum performance was obtained as determined by observing the fraction of light coupled from one polarization mode to the other. Thereafter, to preserve the optimum orientation, the fiber 230 was cemented between the lithium niobate substrate 232 and the flat silicon plate 236 using ultraviolet cured epoxy, sparingly applied, as described above in connection with FIG. 12. After the cement has cured, the pressure of the silicon plate 236 is applied to set the bias without changing the angular orientation of the fiber 230. The optimum angle $\phi$ (illustrated in FIG. 12 for the embodiment of FIG. 10), as inferred from the static coupling measurements, was 65.5° measured from the fast axis, (i.e., the Y-axis). While positioning the fiber 230 for optimum angular orientation, the fiber 230 is also maintained close to the juncture of the Fresnel and Fraunhofer regions and substantially in parallel alignment with the acoustic transducers 234, as described above.

In the normal mode of operation, the amplitude modulator of FIG. 13 is statically biased to a point on a relatively linear portion of the coupling curve 239 of FIG. 16, and then the coupling is varied about that point by the application of the surface acoustical waves. In this way, the electrical signal applied to the transducers 234 is faithfully reproduced as fluctuations in the optical power in the polarization modes as was illustrated with respect to the coupling curve 99 in FIG. 8. As set forth above, static biasing is accomplished by using the flat pressure plate 236 to push the fiber 230 against the lithium niobate substrate 232.

To obtain the best linear performance of the present invention, the applied force should be such that the bias is set midway between a peak and a trough of the curve 239 FIG. 16. As illustrated, the device can be operated at a number of places on the coupling curve 239 of FIG. 16. For example, point A on lobe 1 of the coupling curve 239 can be achieved with substantially less applied pressure than other bias points on the other lobes (i.e., lobes 2-8). However, the device when biased at point A has the disadvantage of having very little modulation depth. In other words, for a given magnitude of oscillation of the stress applied to the fiber 230 (FIG. 13), the change in the fraction of power coupled from one polarization mode to the other is less at point A than at other bias points, such as points B and C, on lobe 2 and lobe 3, respectively. This is a result of the slope of the coupling curve 239 being substantially less at bias point A, than at points B and C. Furthermore, the maximum change in the fraction of coupled power along the linear region around bias point A is substantially less than at other potential bias points, such as points B and C.

Bias point B on lobe 2 is a substantial improvement over bias point A both in slope and in maximum coupling change. However, it has been found that bias point C on lobe 3 offers the best compromise as a bias point. The slope at bias point C is greater than at bias point B and the maximum change in coupled power over the linear region is greater. These two benefits are achieved with a relatively small increase in applied static stress. Increasing the applied force to move the bias point to lobes 4-8 provides relatively minor increases in the maximum fraction of coupled power and the slope. Thus, there is relatively little to be gained by increasing the static stress beyond bias point C. Furthermore, the possibility of damaging the fiber 230 is increased as the applied pressure is increased.

Figure 17:
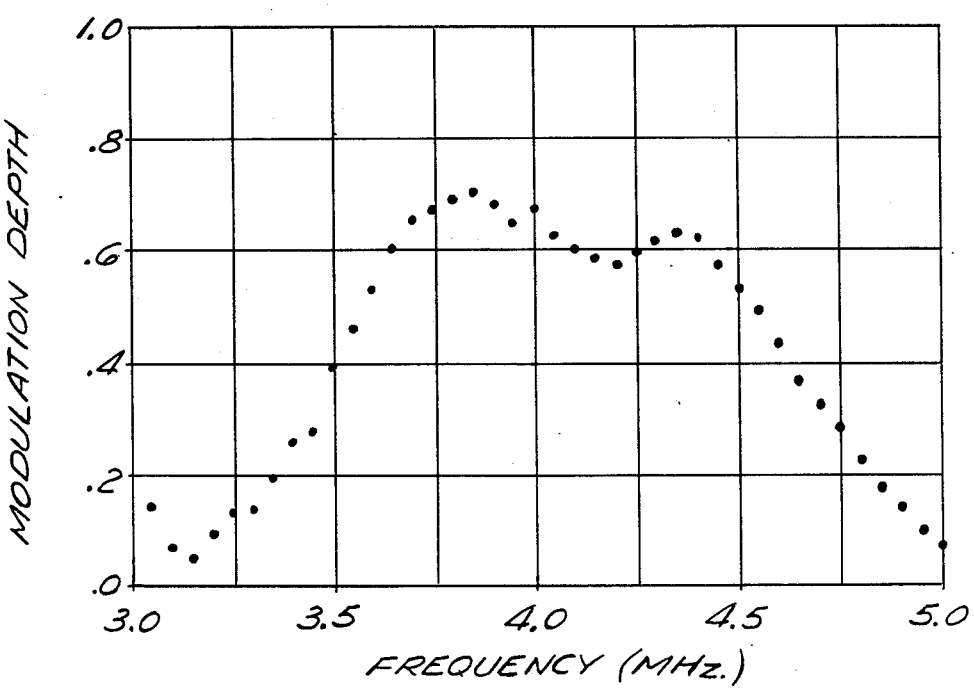
FIG. 17 is a graph of the frequency response of a flat plate modulator of the present invention.

One particular advantage of this type of modulator is that the bandwidth of the device depends only on the bandwidth of the transducers 234 and the matching network, which can be made quite broad. FIG. 17 illustrates an exemplary measurement taken at bias point C (FIG. 16) with 111 volts peak-to-peak applied to the transducer array. The response illustrated in FIG. 17 has a full width at half maximum (FWHM) of 1.15 MHz. The peak at 4.35 MHz corresponds to the synchronous excitation of the surface wave (i.e., the wavelength of the acoustic waves is a multiple of the transducer finger spacing as explained above) while the peak at a lower frequency is a result of a particular matching network connected to the array of transducers 234. For optimal performance, the invention is preferably operated at or near 4.35 MHz.

The embodiment of FIG. 13 can also be advantageously used with a ridged pressure plate (such as was described in connection with FIG. 2) in the place of the flat pressure plate 236. In this alternative embodiment (not shown), the ridges of the pressure plate are preferably aligned with the wave fronts of the acoustic waves generated by the transducers 234 such that the acoustic waves impinge upon the fiber 230 at the stressed regions caused by the ridges of the pressure plate. In this alternative embodiment, the static coupling caused by applying pressure to the ridged pressure plate will be defined by the coupling curve 99 in FIG. 8. Use of such a ridged plate is advantageous because less pressure is required to provide a static biasing point on a linear portion of the coupling curve 99 of FIG. 8 than on a high-slope lobe of the coupling curve 239 of FIG. 16. However, the construction of this alternative embodiment requires relatively precise matching requirements for the ridged block and accurate alignment of the ridges with the acoustic wave paths.

Figure 18:
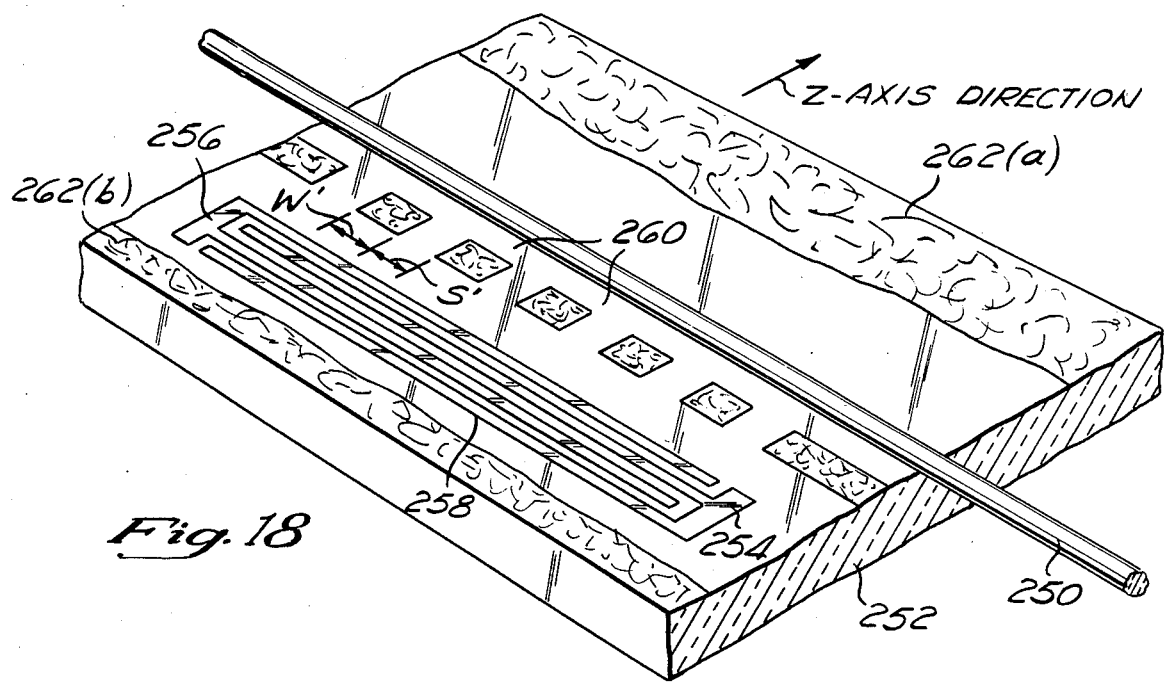
FIG. 18 is an alternative embodiment of the present invention.

FIG. 18 illustrates an alternative embodiment of the invention in which a continuous transducer 258 is used to generate the acoustic wave fronts. A birefringent optical fiber 250 is placed across a lithium niobate substrate 252, perpendicular to the Z-axis of the substrate, as before. A flat pressure plate (not shown) of silicon or other material is applied to the fiber 250 to provide pressure to stress the fiber 250 as described above, in reference to FIG. 13. Bonding pads 254 and 256 are extended as interdigital fingers to form one large transducer 258 as shown, rather than a plurality of smaller transducers as illustrated in the embodiment of FIG. 13. An acoustic wave front is generated across the full width of the overlap of the interdigital fingers of the transducer 258. A series of acoustic absorbers 260 are placed between the interdigital transducer 258 and the optical fiber 250. The width, W', of each absorber 260 is substantially equal to an odd multiple of one-half the beat length of the fiber 250, and the absorbers 260 are spaced, S', by an odd multiple of one-half the beat length (i.e., nL/2 where n is an odd integer). Thus, a series of acoustic waves pass between the absorbers 260 which have a width substantially equal to an odd multiple of one-half the beat length (nL/2) and which are separated by an odd multiple of one-half the beat length (nL/2). Therefore, when the fiber 250 is stressed by applying force to the flat pressure plate (not shown) the fiber 250 is biased in accordance with a coupling curve such as coupling curve 239 in FIG. 16, and substantially the same results are obtained as with the embodiment of FIG. 13 without using a plurality of individual transducers 234 as shown in FIGS. 13 and 14, and without requiring the interconnection of the plurality of transducers 234. Acoustic absorbing material 262a and 262b is applied in the same locations as in the other embodiments to suppress reflected acoustic waves.

Figure 19:
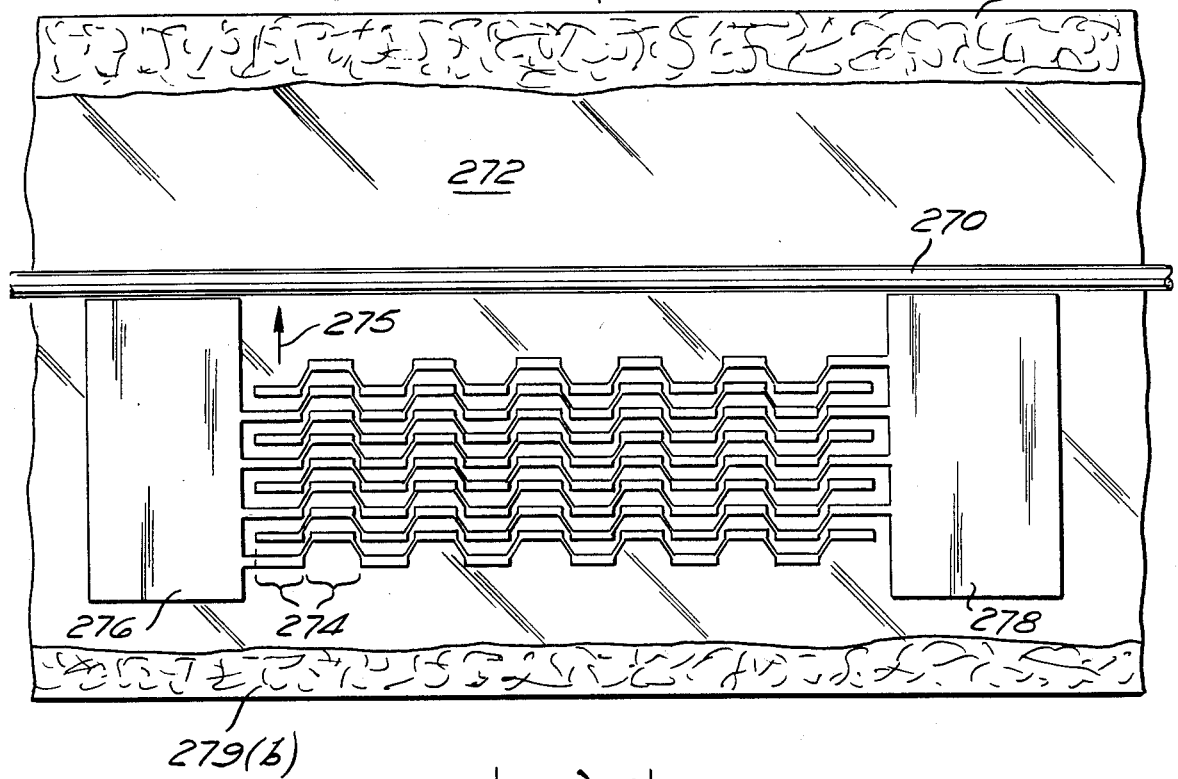
FIG. 19 is an alternative embodiment of the present invention.
Figure 20A:
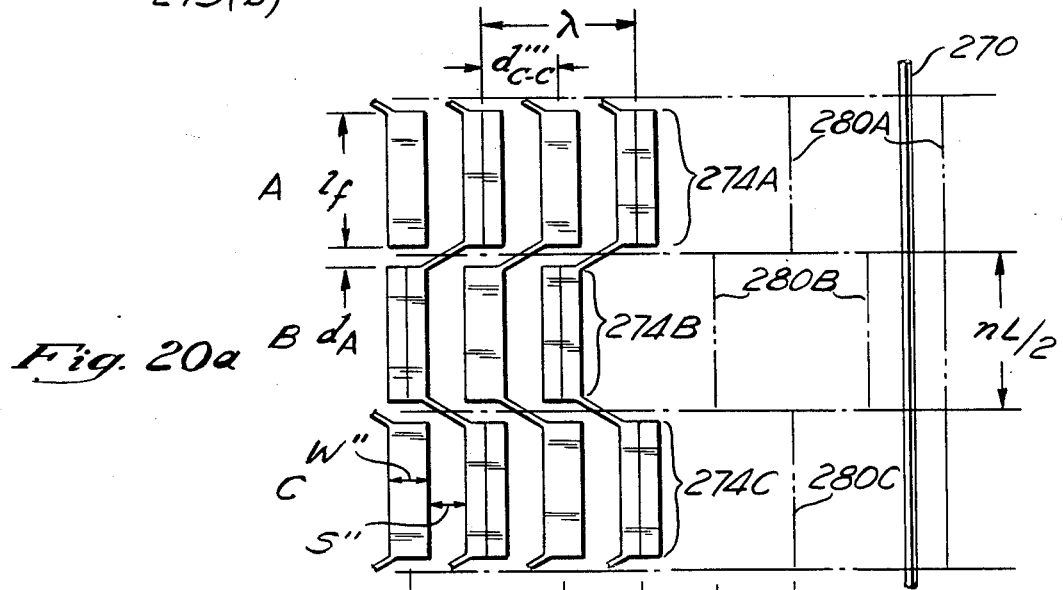
FIGS. 20(a) and 20(b) are an enlarged pictorial view of the transducers of the embodiment of FIG. 19 and the resulting waveforms, respectively.
Figure 20B:
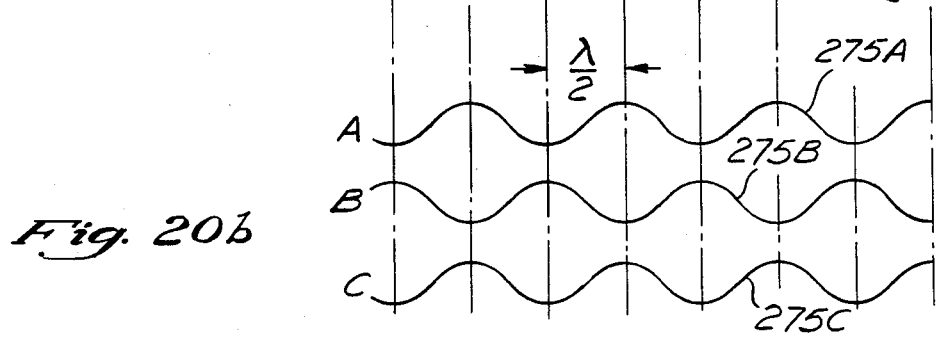

Another preferred embodiment of the invention is illustrated in plan view in FIG. 19. A fiber 270 is placed across a lithium niobate substrate 272 and is biased to a linear bias point, such as point C in FIG. 16, by a flat silicon plate (not shown), as described before in reference to FIG. 13. A series of adjacent interdigital transducers 274 are formed by etching a mask on the surface of the lithium niobate material 272, between two bonding pads 276, 278, as before to generate acoustic waves in the direction 275. As shown in FIG. 20(a), which is an enlarged view of portions of three exemplary transducers 274, each transducer 274 comprises fingers having a width W''', of 200 μm, and a spacing, S''', of 200 μm. Thus, the center-to-center spacing, d'''$_{c-c}$, of the fingers is 400 μm.

As in the previous embodiments, adjacent sets of interleaved fingers are connected to respective bonding pads 276, 278. An oscillating voltage applied to the bonding pads 276, 278 will generate stresses in the lithium niobate substrate 272 and generate acoustic waves (illustrated as wave fronts 280A, 280B, 280C in FIG. 20(a)) which propagate in the direction toward the fiber 270 and have the frequency of the applied voltage. As explained above in connection with FIGS. 11(a) and 11(b), for the dimensions given in this example, an oscillating voltage having a frequency of 4.35 MHz is preferable as it will resonate with the transducers 274. This is illustrated by the acoustic waves 275A, 275B, 275C in FIG. 20(b) which have peaks (i.e., maximum amplitudes) corresponding to the wave fronts 280A, 280B, 280C in FIG. 20(a).

As also seen in FIGS. 19 and 20(a), the fingers of adjacent transducers 274 are electrically interconnected such that a continuous electrical path is provided from each bonding pad 276, 278 to the fingers to be supplied with voltage by each pad 276, 278. Thus, unlike FIG. 13, no additional wires need to be provided to interconnect the fingers, and the entire array of transducers 274 can be manufactured by semiconductor techniques. In order to provide the spatially periodic stress required to modulate the optical signal in the fiber 270, the corresponding fingers of adjacent transducers 274 are offset by the center-to-center spacing, d'''$_{c-c}$, (i.e., 400 μm) in the direction of propagation of the acoustic waves (as indicated by the arrow 275 in FIG. 19). Thus, as shown in FIG. 20(a), the acoustic wave fronts 280A and 280C, generated by the transducers 274A and 274C, effectively lead the acoustic wave fronts 280B generated by the transducer 274B by 400 μm. When the frequency of the oscillating voltage source is advantageously chosen to be 4.35 MHz, as explained in connection with FIGS. 11(a) and 11(b), the 400 μm lead corresponds to a one-half wavelength ($\frac{1}{2}\lambda$) or $\pi$ radian lead as illustrated for acoustic waves 275A, B, C in FIG. 20(b). Thus, instead of the spatially periodic stress on the fiber 270 being provided by alternating regions affected by time varying acoustic stress and not affected by time varying acoustic stress, as in the embodiments of FIGS. 13 and 18, the spatial periodicity is provided by alternating regions having acoustic waves of opposite magnitudes (i.e., if the acoustic wave from one transducer is at its maximum amplitude, the acoustic waves from transducers adjacent to it will be at their minimum amplitude). This has the effect of increasing the the acoustic pressure difference between adjacent nL/2 wide regions without requiring an increase in the voltage applied to the transducers 274.

As shown in FIG. 20(a), the distance $l_a$, between corresponding locations on the fingers of adjacent transducers is substantially equal to nL/2 in order to provide the spatial periodicity between the alternating stress regions of the fiber 270. However, as explained above, adjacent fingers are not electrically connected; therefore, a small gap or distance, $d_A$, is provided between adjacent fingers to provide electrical isolation. The distance, $d_A$, is small compared with the length, $l_f$, of the fingers. Thus, the length $l_f$, is substantially equal to nL/2 and the acoustic wave fronts 280 A, B, C, which impinge on the fiber 270, have widths substantially equal to nL/2.

An acoustic absorbing material 279(a), 279(b) along the edges of the substrate 272 functions as in the other embodiments to suppress reflections of the acoustic waves to inhibit interference with the generated waves.

The foregoing embodiments of the present invention are advantageously used by amplitude modulating a 4.35 MHz electrical signal applied to the acoustic transducers with a modulating signal on which information is encoded. The power coupled between polarization modes will vary at a 4.35 MHz rate, with the magnitude of the coupling changing in response to the amplitude of the modulation applied to the 4.35 MHz electrical signal. The light signal in the coupled mode can be detected by a detector as described before in connection with FIG. 6. The electrical output of an exemplary detector can then be demodulated to reproduce the encoded modulating signal. Those skilled in the art will recognize that the encoding of information may also be accomplished by frequency modulating the 4.35 MHz signal before applying it to the transducers. In addition it will be understood that the optical biasing provided by the biasing plates 210 (FIG. 10) and 236 (FIG. 13) may also be provided by introducing light into both polarization modes of the fiber such that there is, for example, an equal light intensity in both polarization modes.

Figure 21:
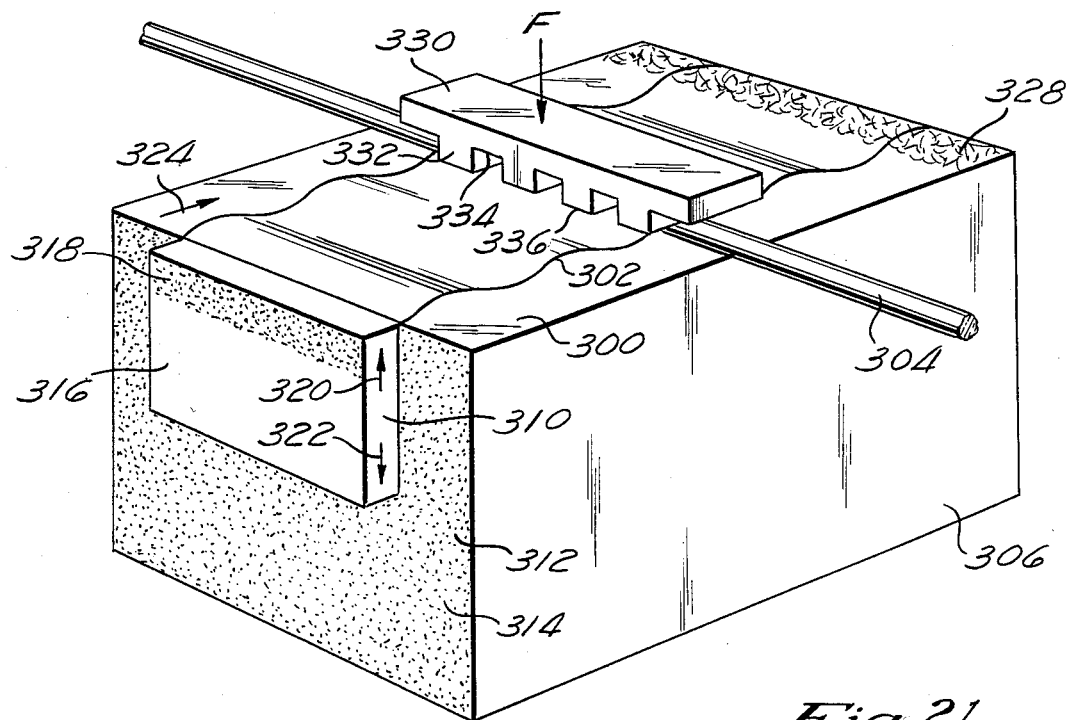
FIG. 21 is a perspective view of an alternative embodiment of the present invention using a edge-bonded transducer to generate acoustic waves on a flat surface and using a ridged block to generate a static stress on an optical fiber.

FIG. 21 illustrates an alternative embodiment of the present invention incorporating a flat surface 300 for conducting a surface acoustic wave 302 towards a birefringent optical fiber 304. In the embodiment shown, the flat surface 300 comprises the upper surface of a block 306, formed of a material such as fused quartz. As shown in FIG. 21, the surface acoustic waves 302 are generated by an edge-bonded PZT (lead-zirconate-titanate) transducer 310 mounted at an end surface 312 of the quartz block 306. Preferably, the end surface 312 of the quartz block 306 is coated with a conductive material, such as an alloy of chromium and gold, which forms an electrode 314 for the transducer 310. The transducer 320 has at least two substantially parallel flat surfaces and is securely mounted (i.e., bonded) to the end surface 312 with one of the flat surfaces in electrical contact with the chromium and gold alloy electrode 314 on the surface 312. The other flat surface (shown as 316) has at least a portion coated with the chromium and gold alloy to form an electrode 318. The electrodes 314 and 318 are thus parallel to each other and are disposed on opposite sides of the transducer 310.

In operation, an oscillating electrical voltage field is applied across the PZT transducer 310 by attaching electrical wires (not shown), connected to a voltage source (not shown), to the chromium and gold alloy electrodes 314 and 318. The PZT transducer 310 vibrates in the directions indicated by the arrows 320 and 322 which are parallel to the surfaces 312 and 314 and perpendicular to the electrical field applied between the two electrodes 314 and 318. The frequency of the vibration of the transducer 310 is substantially equal to the frequency of the oscillating electrical voltage field applied to the chromium and gold alloy electrodes 314 and 316. The vibration of the PZT transducer 310 induces the surface acoustic wave 302 on the flat surface 300 of the quartz block 306. The surface acoustic wave 302 travels in the direction indicated by an arrow 324 which is perpendicular to the end surface 312 of the quartz block 306 and also perpendicular to the flat surface 316 of the PZT transducer 310. Accordingly, the surface acoustic wave 302 comprises a series of parallel wave fronts (not shown) which travel away from the PZT transducer 310 towards the fiber 304.

The optical fiber 304 is advantageously positioned on the surface 300 of the quartz block 306 so that the longitudinal axis of the optical fiber 304 is parallel to the wave fronts of the acoustic wave 302. This is accomplished by orienting the optical fiber 304 so that the longitudinal axis is substantially parallel to the end surface 312 of the quartz block 306. Thus, each of the wave fronts of the acoustic wave 302 will contact the optical fiber 304 along the entire length of the wave front at substantially the same instant in time. An acoustic absorbing material 328 is preferably placed on the flat surface 300 near an end of the block 306 opposite the end surface 312 on which transducer 310 is positioned. The acoustic absorbing material 328 absorbs the portion of the acoustic wave 302 propagating past the optical fiber 304 so that there is no reflection of the acoustic wave 302 back towards the optical fiber 304.

The device illustrated in FIG. 21 further includes a ridged block 330 similar to that described in connection with FIGS. 1, 2, and 4a. In an especially preferred embodiment, the ridged block 330 is a small silicon bar (e.g., having dimensions of 0.1 inch $\times$ 0.1 inch $\times$ 1.25 inch). The ridged block 330 includes ridges 332 formed by spaced grooves 334, so as to form a series of spaced flat surfaces 336 on the block 330. In the embodiment shown the grooves 334 have a width of one-half beat length of the fiber and the surfaces 336 also have a width of one-half beat length, so as to yield a periodicity of one beat length. The grooves 334 can be formed in the flat surface 336 by sawing, etching, or other known techniques.

The ridged block 330 is placed on the optical fiber 304 with the boundaries between the ridges 332 and grooves 334 perpendicular to the longitudinal axis of the optical fiber 304. Preferably, the flat surfaces 336 of the ridged block 330 are positioned parallel to the flat surface 300 of the quartz block 306. A force or pressure (indicated as F in FIG. 21) is applied to the ridged block 330 in a direction perpendicular to the flat surface 300 of the quartz block 306 so that the fiber 304 is statically stressed to optically bias the coupling between the modes, as discussed in connection with FIGS. 4a-4g. Preferably, the force F is applied with a magnitude such that the fiber is stressed to a level corresponding to the location 109 on the coupling curve illustrated in FIG. 8 (i.e., approximately 50% of the optical energy in one polarization mode is coupled to the other polarization mode). As set forth in connection with FIGS. 1 through 9, the optical fiber 304 is optimally positioned so that the axes of birefringence are at an angle of 45° with respect to the applied force F. As indicated above, the widths of the ridges 332 and the grooves 334 are each selected to be substantially equal to one-half the beat length of the fiber 304 at a selected optical frequency.

The force F also causes the ridged block 330 to force the fiber 304 into solid contact with the flat surface 300 in the areas of the ridges 332. Thus, the wave fronts of the surface acoustic wave 302 will strike the optical fiber 304 in the areas of the ridges and modulate the stresses applied to the optical fiber 304. The portions of the optical fiber 304 proximate to the grooves 334 of the rigid block 330 are not pressed against the flat surface 200 of the quartz block 306. Thus, very little of the acoustic energy is transferred from the acoustic wave 302 to the optical fiber 304 in the portions of the optical fiber 304 proximate to the grooves 334. The acoustic wave fronts have a width, as measured parallel to he longitudinal axis of the optical fiber 304, which is a plurality of the beat lengths wide so that the acoustic wave fronts impact multiple portions of the optical fiber 304 that are stressed by the ridges 332 of the ridged block 330. The modulated stresses along the length of the fiber 304 cause the coupling of optical energy between the polarization modes to vary about a static, optically biased modulation level as illustrated in FIG. 8 and as discussed in connection therewith. For example, a change in force of amplitude Δf caused by an acoustic wave 302 having a time varying amplitude similar to the waveform 106 in FIG. 8 can cause a change in coupling similar to the waveform 108 in FIG. 8. Thus, the optical energy coupled from one polarization to another is modulated in accordance with the amplitude and frequency of the acoustic wave 304 which is in turn responsive to the electrical signal applied to the PZT transducer 310.

Figure 22:
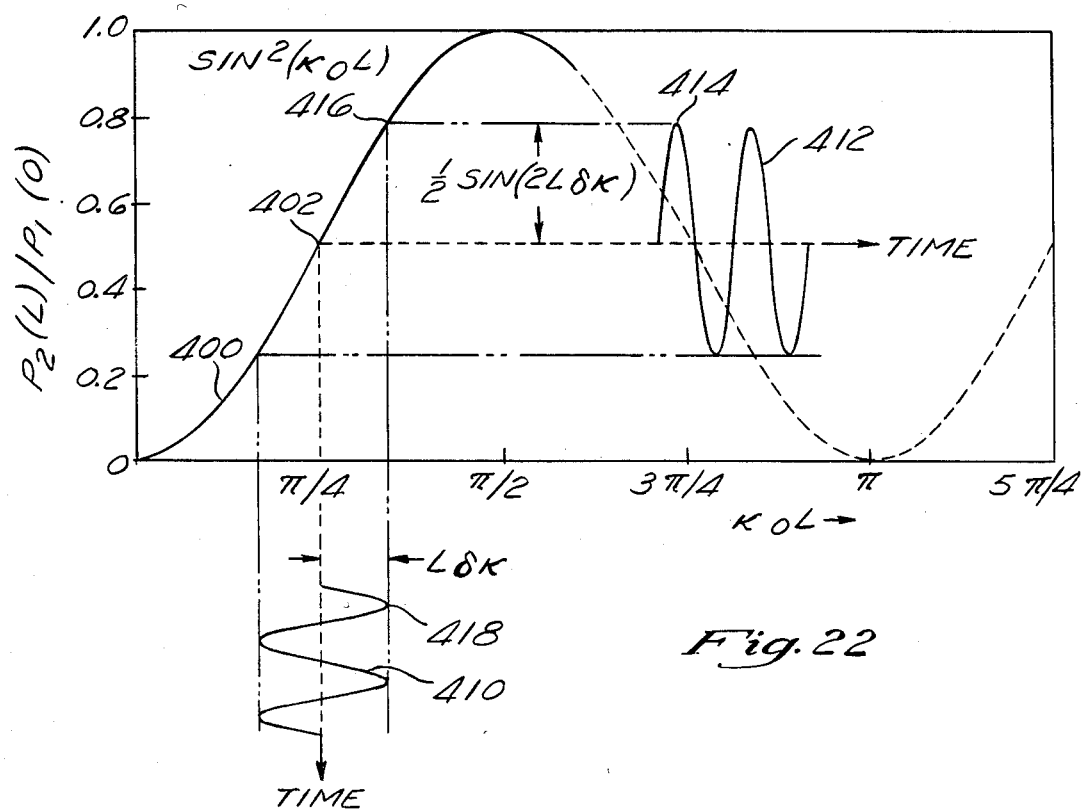
FIG. 22 is a graphical representation of the fraction of coupling of light from a first polarization mode to a second polarization mode in the embodiment of FIG. 21 as a function of the stres induced by the static force of the ridged block and the force caused by the acoustic wave.

FIG. 22 illustrates a coupling curve for the embodiment of FIG. 21 which is similar to the coupling curve of FIG. 8. The vertical axis represents the fraction of the optical energy input into a first polarization mode which is coupled to a second polarization mode, where $P_1(0)$ is the relative magnitude of the optical energy in the optical fiber 304 in the first polarization mode prior to entering the portion of the optical fiber 304 stressed by the ridged block 330 and $P_2(L)$ is the relative magnitude of the optical energy in the second polarization mode after passing through a portion of the optical fiber 304 stressed by a ridged block 330 of length L. The length L is equal to the number of ridges (N) times the beat length ($L_B$) between ridges (i.e., $NL_B$) and is thus equal to the effective interaction length of the ridged block 330 with the optical fiber 304. The vertical scale is presented as:

$$P_2(L)/P_1(0)$$

A magnitude of 1.0 on the vertical scale represents the transfer of substantially all of the optical energy from the first polarization mode to the second polarization mode. A magnitude of 0.5 on the vertical scale represents the transfer of approximately one-half of the optical energy from the first polarization mode to the second polarization mode.

The horizontal scale in FIG. 22 represents the applied force F (FIG. 21) as the product of a coupling coefficient per unit length ($\kappa_0$) times the length (L) of the ridged block 330 (i.e., $\kappa_0 L$). The fraction of the energy coupled from the first polarization mode to the second polarization mode as a function of the product of the coupling coefficient and the length (i.e., $\kappa_0 L$) is shown in FIG. 22 as a curve 400. The curve 400 varies as a sine-squared function as the $\kappa_0 L$ product increases:

$$P_2(L)/P_1(0) = \sin^2(\kappa_0 L) \tag{12}$$

The curve 400 starts at zero magnitude when the product is zero and increases to a maximum fraction of coupling of 1.0 (i.e., substantially 100% of the energy coupled from the first polarization mode to the second polarization mode) when the $\kappa_0 L$ product is equal to $\pi/2$ radians. If the $\kappa_0 L$ product is increased beyond $\pi/2$ radians, either by using a longer ridged block or by increasing the force F to thereby increase the coupling coefficient $\kappa_0$, the optical signals in the optical fiber 304 becomes overcoupled causing energy to be coupled from the second polarization mode back to the first polarization mode. This is represented as a decrease in the coupled fraction when $\kappa_0 L$ is increased beyond $\pi/2$ radians. Thus, the coupling curve 400 is periodic.

At $\kappa_0 L$ equal to $\pi/4$, the fraction of the coupled power is $\sin^2(\pi/4)$ or 0.5 which represents one-half of the energy input in the first polarization coupled to the second polarization mode. This amount of coupled power is represented by the location 402 on the coupling curve 400. Preferably, the force F applied to the ridged block 330 is chosen so that the coupling between the modes of the optical fiber 304 is statically optically biased to vary about the location 402 on the coupling curve 400. With the optical fiber 304 so biased, the acoustic wave 302 is propagated along the flat surface 300 of the block 306 to strike the portions of the optical fiber 304 in contact with the ridges 332 of the ridged block 330. The effect of the acoustic wave 302 is to periodically increase and decrease the coefficient of coupling by a magnitude $\delta\kappa$. Thus the stress applied to the optical fiber 304 will vary by an amount $L\delta\kappa$ and the fraction of the power transferred from the first polarization mode to the second polarization mode will vary in response to the change in stress. The variation in the stress caused by the acoustic wave 302 is illustrated in FIG. 22 as a sinusoidal curve 410 having a maximum amplitude of $L\delta\kappa$ and having a frequency equal to the acoustic frequency. The effect of the variation of the stress on the coupled fraction is shown as a curve 412 having the same frequency as the acoustic frequency and having a maximum amplitude of $\frac{1}{2}\sin(2L\delta\kappa)$. The maximum amplitude of the output curve 412 is shown at a location 414. The amplitude at the location 414 corresponds to a location 416 on the coupling curve 400 and thus to a location 418 on the stress curve 410. The fraction of coupling at the location 416 on the coupling curve 400 is given by:

$$P_2(L)/P_1(0) = \sin^2(\pi/4 + L\delta\kappa) \tag{13}$$

by trigonometric substitution, it may be found that:

$$P_2(L)/P_1(0) = [\sin(\pi/4)\cos(L\delta\kappa) + \sin(L\delta k)\cos\pi/4]^2 \tag{14}$$

The equation (14) may be progressively simplified as indicated in Equations (15)–(19), below.

$$P_2(L)/P_1(0) = [(1/\sqrt{2})\cos(L\delta k) + (1/\sqrt{2})\sin(L\delta k)]^2 \tag{15}$$

$$P_2(L)/P_1(0) = \tfrac{1}{2}[\cos(L\delta k) + \sin(L\delta k)]^2 \tag{16}$$

$$P_2(L)/P_1(0) = \tfrac{1}{2}[\cos^2(L\delta k) + 2\sin(L\delta k)\cos(L\delta k) + \sin^2(L\delta k)] \tag{17}$$

$$P_2(L)/P_1(0) = \tfrac{1}{2}[1 + 2\sin(L\delta k)\cos(L\delta k)] \tag{18}$$

$$P_2(L)/P_1(0) = \tfrac{1}{2}[1 + \sin(2L\delta k)] \tag{19}$$

Therefore, Equation (13) may be reduced to:

$$P_2(L)/P_1(0) = \tfrac{1}{2} + \tfrac{1}{2}\sin(2L\delta k) \tag{20}$$

Equation (20) shows that the amplitude of the output curve 412 contains a term "$\tfrac{1}{2}$" corresponding to the static biasing and a term "$\tfrac{1}{2}\sin(2L\delta k)$" corresponding to the effect of the acoustic wave 302.

The modulation depth of the device illustrated in FIG. 21 is defined as the peak-to-peak variation of the output power expressed as a function of the total power, and is given by:

$$\beta = \sin(2L\delta\kappa) \tag{21}$$

The pressure variation induced by the acoustic wave 302 is proportional to the voltage applied to the transducer 310, so the performance (i.e., the modulation depth) of the apparatus is also characterized by the expression:

$$\beta = \sin(\gamma V) \quad (22)$$

where V is the transducer voltage and $\gamma$ is a proportionality constant.

Figure 23:
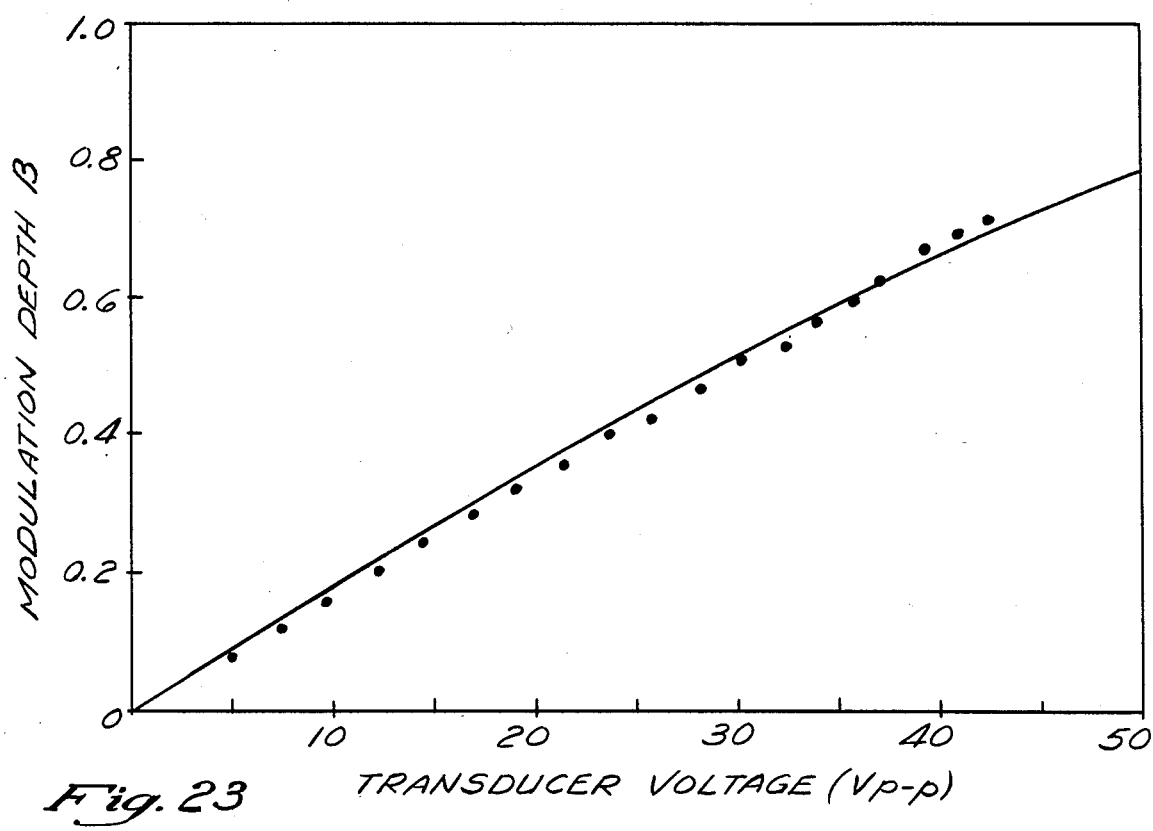
FIG. 23 is a graphical representation of the modulation depth of the embodiment of FIG. 21 as a function of the voltage applied to the transducer.

In one experimental apparatus constructed in accordance with the embodiment of FIG. 21, an optical fiber 304 having a cladding diameter of 50 $\mu$m and a core measuring roughly 1 $\mu$m by 2 $\mu$m provides a beat length $L_B$ of the optical fiber 304 of 1.7 mm at a wavelength of 633 nm. Fifteen ridges were constructed on a small silicon bar 330 having dimensions of 0.1×0.1×1.25 inches by sawing grooves into the bar. The average ridge width was 0.93 mm and the average groove width was 0.80 mm in the experimental apparatus, although preferably the ridges 332 and the grooves 334 would have a substantially equal width of 0.85 mm which is one-half of the 1.7 mm beat length $L_B$. The transducer 310 had a measured center frequency of 4.5 MHz and a 3 dB bandwidth of approximately 4 MHz. FIG. 23 shows the experimentally determined modulation depth $\beta$ for one embodiment of the invention shown in FIG. 21 as a function of the peak-to-peak transducer voltage V at a frequency of 3.9 MHz. A maximum modulation depth of 70% was obtained at a peak-to-peak voltage of 42.5 volts in the tested embodiment. Thus, the proportionality constant $\lambda$ is calculated as 0.018 radians/volt (i.e., 0.7÷42.5 volts). A modulation depth of 70% was obtained when the optical fiber 304 was aligned substantially parallel to the acoustic wave fronts of the acoustic wave 302 and when the force F was applied uniformly to the ridged block 330 over the interaction length $NL_B$. Additional improvement in the modulation depth can be expected by fabrication of the ridges 332 and the grooves 334 to be precisely equal to one-half of the beat length $L_B$.

Figure 24:
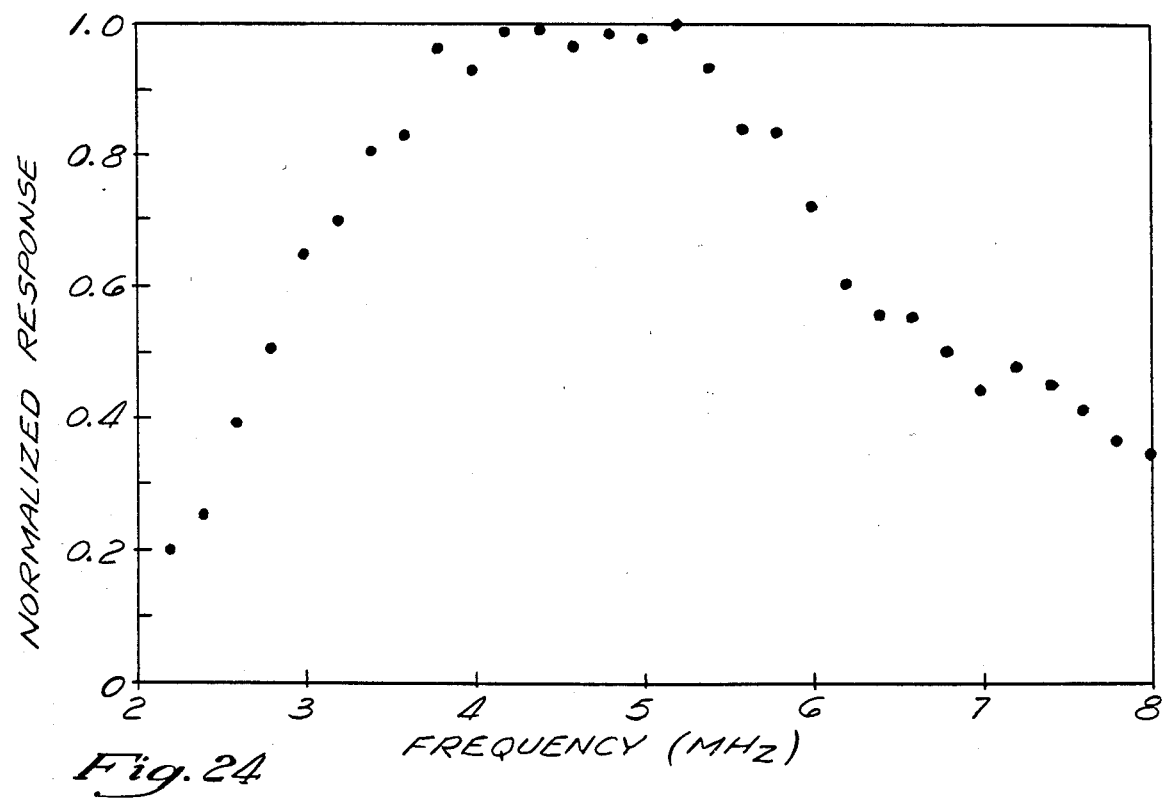
FIG. 24 is a graphical representation of the frequency response of the embodiment of FIG. 21.

The experimentally determined frequency response of the apparatus constructed in accordance with the present embodiment is shown in FIG. 24 wherein the vertical axis is the normalized response (i.e., 1.0 on the vertical scale is the maximum response and other responses, indicated by dots, are normalized to the maximum response), and wherein the horizontal scale is the frequency of the acoustic wave 302 in megahertz. As illustrated, the tested device has a substantially flat response centered at approximately 4.5 MHz and having a bandwidth of 1.5 MHz and has a 3 dB response bandwidth (i.e., a response of 50% or better relative to the maximum response) of approximately 4 MHz (from 3 MHz to 7 MHz). The 3 dB bandwidth is believed to be a function of the response of the transducer 310 rather than of the block 306 and the optical fiber 304. Thus, the apparatus can be used at other acoustic frequencies by substituting transducers having other response characteristics.

The embodiment of FIG. 21 is flexible in that the transducer 310 does not need to be designed for a particular acoustic frequency. Thus, the frequency of modulation of the optical signal with the fiber 304 can be varied by changing the frequency of the electrical signal applied to the transducer 310. Furthermore the embodiment of FIG. 21 can be adapted to optical signals having different beat lengths in the fiber 304 by using the ridged blocks 330 with ridges spaced to correspond to desired beat lengths.

The principles set forth above with respect to varying the coupling between polarization modes in the abovedescribed devices can also be applied to coupling between first and second order propagation modes in birefringent and non-birefringent fibers. Typically, the widths of the acoustic wave fronts and the gaps therebetween are correspondingly smaller because the beat length of the fiber for first and second order mode propagation is shorter. The theory regarding coupling between first and second order propagation modes is described in copending Application Ser. No. 556,306 filed on Nov. 30, 1983, assigned to the assignee of the instant application, and entitled "FIBER OPTIC MODAL COUPLER," and in a paper entitled, "Two-mode fiber modal coupler," R. C. Youngquist, et al., *OPTICS LETTERS*, Vol. 9, No. 5, May 1984, pages 177-179.

Although the invention has been described in terms of the preferred embodiment, many variations will be apparent to those skilled in the art. All such variations are intended to be included within the appended claims.

What is claimed is:

1. A device for coupling light between the propagation modes of an optical fiber, comprising:
   a substrate, in acoustic contact with said fiber, said substrate having means for guiding plural surface acoustic waves thereon, so that said plural waves impact said fiber at respective plural regions along said fiber, said plural regions each having a length substantially equal to an odd multiple of half beat lengths of said fiber; and
   a transducer for generating said surface acoustic waves in said substrate, said transducer oriented to produce wave fronts parallel to the longitudinal axis of said fiber, said transducer producing a phase relationship among said plural acoustic waves which causes additive coupling of light from one of said modes to the other of said modes.

2. The device for coupling light between propagation modes of an optical fiber as defined in claim 1, wherein said guiding means comprises plural ridges on said substrate.

3. The device for coupling light between propagation modes of an optical fiber as defined in claim 1, wherein said substrate is anisotropic and said guiding means comprises the crystal lattice structure of said substrate, said lattice structure causing preferential propagation of the energy of said acoustic waves.

4. The device for coupling light is defined in claim 3, wherein said optical fiber is positioned relative to said transducer substantially at the juncture of the Fraunhofer and Fresnel regions of said plural acoustic waves.

5. A fiber optic amplitude modulator, comprising:
   an optical fiber for guiding light, said fiber having two modes of propagation, each of said modes having a different propagation velocity;
   means for producing a surface acoustic wave and for conducting said acoustic wave towards said fiber to impact said fiber, the impact of said surface acoustic wave causing an oscillating stress in said fiber which is time varying, said acoustic wave having wave fronts oriented substantially parallel to the longitudinal axis of said fiber, said time varying stress causing time varying coupling of light between said modes of propagation; and
   means for optically biasing said time varying coupling to cause said coupling to vary substantially linearly with said oscillating stress.

6. A fiber optic amplitude modulator, as defined by claim 5, wherein said means for optically biasing comprises a pair of plates for squeezing said fiber therebetween.

7. A fiber optic amplitude modulator, as defined by claim 6, wherein one of said plates has ridges to cause said static stress to occur at intervals along said fiber.

8. A fiber optic amplitude modulator, as defined in claim 5, further including means for applying a static force in a direction normal to the longitudinal axis of said fiber to statically stress said optical fiber, to cause a predetermined amount of optical coupling between said modes of propagation.

9. A fiber optic amplitude modulator, as defined in claim 5, wherein said static force is applied at beat length intervals along a length of said optical fiber.

10. A fiber optic amplitude modulator, as defined in claim 5, wherein said acoustic wave fronts impact said optical fiber through a distance equal to at least a plurality of beat lengths of the optical fiber.

11. A fiber optic amplitude modulator comprising:
an optical fiber waveguide for guiding light, said waveguide having two orthogonal modes of propagation, each of said modes having a different propagation velocity;
a surface acoustic wave conductor, in acoustic contact with said fiber, for conducting a series of surface acoustic waves towards said fiber to impact said fiber at spaced intervals along said fiber to form a series of first regions and a series of second regions, such that adjacent ones of said first regions are spaced by one of said second regions, the impact of said surface acoustic waves along said fiber causing an oscillating stress in each of said first regions which is time varying relative to any stress in said second regions, each of said series of waves having wave fronts oriented substantially parallel to the longitudinal axis of said fiber, the wave fronts synchronized such that said time varying stress is said first regions is the same for each of said first regions, said time varying stress causing time varying coupling of light between said modes of propagation; and
means for generating said surface acoustic waves.

12. The fiber optic amplitude modulator of claim 11, wherein said generating means additionally generates a second series of surface acoustic waves, said acoustic wave conductor conducting said second series of surface acoustic waves to impact said fiber at said second regions to cause an oscillating stress in each of said second regions which is time varying relative to stress in said first regions, each of said second series of waves having wave fronts oriented substantially parallel to the longitudinally axis of said fiber, the wave fronts of said second series of waves synchronized such that said time varying stress in said second regions is the same for each of said second regions.

13. The fiber optic amplitude modulator of claim 12, wherein said series of acoustic waves and said second series of adjacent acoustic waves are separated in phase by $\pi$ radians.

14. The fiber optic amplitude modulator of claim 11, wherein said first and second regions each have a length equal to an odd multiple of one-half beat length of said fiber.

15. The fiber optic amplitude modulator of claim 11, additionally comprising a member for applying a static stress to said fiber to statically optically bias the coupling of light between said modes to a predetermined value, said time varying stress caused by said acoustic waves modulating the coupling between said modes about said predetermined value.

16. The fiber optic amplitude modulator of claim 15, wherein said member for applying a static stress is configured to apply force along a continuous length of said fiber, said length including plural first regions and plural second regions and wherein said fiber is in acoustic contact with a flat surface of said conductor throughout said length.

17. The fiber optic amplitude modulator of claim 11, wherein said acoustic waves propagate in a direction normal to the longitudinal axis of said waveguide.

18. The fiber optic amplitude modulator of claim 17, wherein said optical fiber waveguide is a birefringent optical fiber having first and second orthogonal axes of polarization.

19. The fiber optic amplitude modulator of claim 18, wherein said time varying stress on said birefringent fiber causes said axes of polarization to shift to cause said time varying coupling of light between said modes.

20. The fiber optic amplitude modulator of claim 11, wherein said acoustic wave conductor comprises a series of ridges for providing said acoustic contact with said fiber, said ridges having a width substantially equal to an odd multiple of one-half the beat length of said optical fiber waveguide, and said ridges being separated by a distance substantially equal to an odd multiple of one-half the beat length of said optical fiber waveguide, said ridges forming acoustic waveguides to direct the propagation of said acoustic waves.

21. The fiber optic amplitude modulator of claim 20, wherein said ridges are formed by depositing material on a surface of said conductor.

22. The fiber optic amplitude modulator of claim 20, wherein said ridges are formed by cutting grooves in a surface of said conductor, said grooves having a width substantially equal to the spacing between said ridges.

23. The fiber optic amplitude modulator of claim 20, wherein said generating means comprises plural acoustic transducers, mounted on respective ones of said ridges.

24. The fiber optic amplitude modulator of claim 11, wherein said acoustic wave conductor is a flat plate and wherein said means for generating said surface acoustic waves comprises a single acoustic transducer and series of acoustical absorbers, said acoustic absorbers each having a width parallel to the longitudinal axis of said fiber substantially equal to an odd multiple of one-half the beat length of said fiber, and said acoustic absorbers spaced apart by a distance substantially equal to an odd multiple of one-half the beat length of said fiber.

25. The fiber optic amplitude modulator of claim 11, wherein said acoustic conductor means is a flat plate and wherein said means for generating said acoustic waves is a plurality of acoustic transducers, each said transducer having a width parallel to the longitudinal axis of said fiber substantially equal to an odd multiple of one-half the beat length of said fiber and said transducers spaced apart by a distance substantially equal to an odd multiple of one-half the beat length of said fiber.

26. A fiber optic apparatus comprising:
an optical fiber having plural coupling segments, each said coupling segment spaced from another coupling segment by a non-coupling segment, said fiber also having first and second propagation modes;
an acoustic generator for generating acoustic energy; and a member having a surface, at least a portion of which is in acoustic contact with said fiber, for applying said acoustic energy to said fiber to cause coupling of light between said modes, said surface of said member being in enhanced acoustic contact with said fiber at intervals along said fiber to apply said acoustic energy preferentially to said coupling segments, such that said coupling of light between said modes is enhanced in said coupling segments and is inhibited in said non-coupling segments.

27. An apparatus, as defined by claim 26, wherein said surface of said member comprises series or ridges, spaced at said intervals.

28. A method of amplitude modulating an optical signal, comprising the steps of:
propagating an optical signal through an optical fiber waveguide, said waveguide having two orthogonal modes of propagation, each of said modes having a different propagation velocity;
conducting a series of surface acoustic waves on said conductor towards said fiber;
orienting said series of waves so that their wave fronts are substantially parallel to the longitudinal axis of said fiber;
impacting said wave fronts against said fiber at spaced intervals to form a series of first regions and a series of second regions, such that adjacent ones of said first regions are spaced by one of said second regions, the impact of said surface acoustic waves along said fiber causing an oscillating stress in each of said first regions which is time varying relative to any stress in said second regions; and
synchronizing the waves such that said time varying stress in said first regions is the same for each of said first regions, said time varying stress causing time varying coupling of light between said modes of propagation.

29. The method of amplitude modulating of claim 28, further comprising the steps of:
conducting a second series of surface acoustic waves towards said fiber;
orienting said second series of waves so that their wave fronts are substantially parallel to the longitudinal axis of said fiber;
impacting said wave fronts against said fiber at said second regions to cause an oscillating stress in each of said second regions which is time varying relative to stress in said first regions; and
synchronizing the wave fronts of said second series of waves such that said time varying stress in said second regions is the same for each of said second regions.

30. The method of amplitude modulating of claim 29, additionally comprising the step of:
phasing said acoustic waves such that said series of acoustic waves and said second series of adjacent acoustic waves are separated in phase by $\pi$ radians.

31. The method of amplitude modulating of claim 28, additionally comprising the step of:
controlling the width and spacing of said wave fronts such that said first and second regions each have a length equal to an odd multiple of one-half beat length of said fiber.

32. The method of amplitude modulating of claim 28, additionally comprising the step of:
statically optically biasing the coupling of light between said modes to a predetermined value, said time varying stress caused by said acoustic waves modulating the coupling between said modes about said predetermined value.

* * * * *

UNITED STATES PATENT AND TRADEMARK OFFICE
CERTIFICATE OF CORRECTION

PATENT NO. : 4,793,676
DATED : December 27, 1988
INVENTOR(S) : Risk

It is certified that error appears in the above-identified patent and that said Letters Patent is hereby corrected as shown below:

Column 1, line 8, change "Serial No. 670,765" to --Serial No. 670,763--

Column 3, line 9, change "the acoutic" to --the acoustic--.

Column 24, line 44, delete the second "the".

Column 26, line 61, change "he longitudinal" to --the longitudinal--.

Column 28, line 60, change "peaka-to-peak" to --peak-to-peak--.

Column 31, line 52, change "longitudinally" to --longitudinal--.

Column 33, line 12, change "series or ridges" to --series of ridges--.

Abstract, line 2, change "polarization codes" to --polarization modes--.

Abstract, line 7, change "apparoximately" to --approximately--.

Signed and Sealed this

Thirteenth Day of August, 1991

Attest:

HARRY F. MANBECK, JR.

*Attesting Officer*  *Commissioner of Patents and Trademarks*